(12) United States Patent
Hatakeyama

(10) Patent No.: US 11,530,307 B2
(45) Date of Patent: *Dec. 20, 2022

(54) STRETCHABLE FILM AND METHOD FOR FORMING THE SAME

(71) Applicant: SHIN-ETSU CHEMICAL CO., LTD., Tokyo (JP)

(72) Inventor: Jun Hatakeyama, Joetsu (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 315 days.

This patent is subject to a terminal disclaimer.

(21) Appl. No.: 16/707,161

(22) Filed: Dec. 9, 2019

(65) Prior Publication Data

US 2020/0207935 A1 Jul. 2, 2020

(30) Foreign Application Priority Data

Dec. 26, 2018 (JP) ............... JP2018-243433

(51) Int. Cl.
| | |
|---|---|
| *C08J 5/18* | (2006.01) |
| *B29C 41/00* | (2006.01) |
| *B29C 41/12* | (2006.01) |
| *C08F 222/10* | (2006.01) |
| *B29K 33/00* | (2006.01) |

(52) U.S. Cl.
CPC ............... *C08J 5/18* (2013.01); *B29C 41/003* (2013.01); *B29C 41/12* (2013.01); *C08F 222/10* (2013.01); *B29K 2033/08* (2013.01); *C08J 2333/14* (2013.01)

(58) Field of Classification Search
CPC ....... C08J 5/18; C08J 2333/14; B29C 41/003; B29C 41/12; C08F 222/10; B29K 2033/08
See application file for complete search history.

(56) References Cited

U.S. PATENT DOCUMENTS

| | | | |
|---|---|---|---|
| 2004/0192082 A1 | 9/2004 | Wagner et al. | |
| 2014/0218872 A1 | 8/2014 | Park et al. | |
| 2014/0220306 A1* | 8/2014 | Uchida | B32B 27/16 |
| | | | 264/494 |
| 2015/0140884 A1 | 5/2015 | Mizuma et al. | |

(Continued)

FOREIGN PATENT DOCUMENTS

| | | |
|---|---|---|
| CN | 103813896 A | 5/2014 |
| JP | 2001-018329 A | 1/2001 |

(Continued)

OTHER PUBLICATIONS

KR-20100018006-A machine translation; 2010.*

(Continued)

*Primary Examiner* — Travis M Figg
(74) *Attorney, Agent, or Firm* — Oliff PLC

(57) ABSTRACT

A stretchable film is made of, at least as a top surface of the stretchable film, a cured product of a stretchable film material containing a silicone polyurethane resin. The top surface of the stretchable film has a repeated uneven pattern formed with depths of 0.1 μm to 2 mm and pitches of 0.1 μm to 5 mm. Thus, the present invention provides a stretchable film having excellent stretchability, with the film top surface being excellent in water repellency and free from sticking; and a method for forming the stretchable film.

15 Claims, 5 Drawing Sheets (a)

(b)

(56) References Cited

U.S. PATENT DOCUMENTS

| | | | |
|---|---|---|---|
| 2016/0052227 | A1 | 2/2016 | Takihara et al. |
| 2017/0335076 | A1 | 11/2017 | Hatakeyama et al. |
| 2018/0134860 | A1* | 5/2018 | Hatakeyama ...... C08G 18/4833 |
| 2018/0215876 | A1* | 8/2018 | Hatakeyama ........ C08G 18/725 |
| 2019/0106528 | A1* | 4/2019 | Hatakeyama ...... C08G 18/7614 |
| 2019/0112413 | A1* | 4/2019 | Hatakeyama ........ C08G 18/755 |
| 2019/0233645 | A1* | 8/2019 | Hatakeyama ...... C08G 18/3203 |
| 2019/0241709 | A1* | 8/2019 | Hatakeyama ........... C08L 75/16 |
| 2020/0267835 | A1 | 8/2020 | Okimoto et al. |

FOREIGN PATENT DOCUMENTS

| | | | |
|---|---|---|---|
| JP | 2004-033468 | A | 2/2004 |
| JP | 2012-152725 | A | 8/2012 |
| JP | 2013-256727 | A | 12/2013 |
| JP | 2015-157875 | A | 9/2015 |
| JP | 2018-083935 | A | 5/2018 |
| JP | 6343903 | B2 | 6/2018 |
| JP | 2018-123304 | A | 8/2018 |
| KR | 10-2010-0018006 | A | 2/2010 |
| KR | 20100018006 | A * | 2/2010 |
| KR | 10-2018-0134278 | A | 12/2018 |
| TW | 201809039 | A | 3/2018 |
| TW | 201829563 | A | 8/2018 |
| WO | 2016/204162 | A1 | 12/2016 |
| WO | 2017/217509 | A1 | 12/2017 |
| WO | 2018/110632 | A1 | 6/2018 |

OTHER PUBLICATIONS

Jul. 21, 2021 Office Action issued in Chinese Patent Application No. 201911356778.5.
Sep. 1, 2021 Office Action issued in Korean Patent Application No. 10-2019-0173234.
Dec. 9, 2019 U.S. Appl. No. 16/707,208 in the name of Jun Hatakeyama.
May 6, 2020 Extended European Search Report issued in European Patent Application No. 19217763.2.
May 6, 2020 Extended European Search Report issued in European Patent Application No. 19217759.0.
Apr. 15, 2021 Office Action issued in Korean Patent Application No. 10-2019-0173233.
Apr. 28, 2022 Office Action Issued In U.S. Appl. No. 16/707,208.
Sep. 28, 2022 Office Action issued in Japanese Patent Application No. 2019-184092.
Aug. 23, 2022 Office Action issued in Japanese Patent Application No. 2019-184070.

* cited by examiner

[FIG. 1]
(a)
(b)
[FIG. 2]
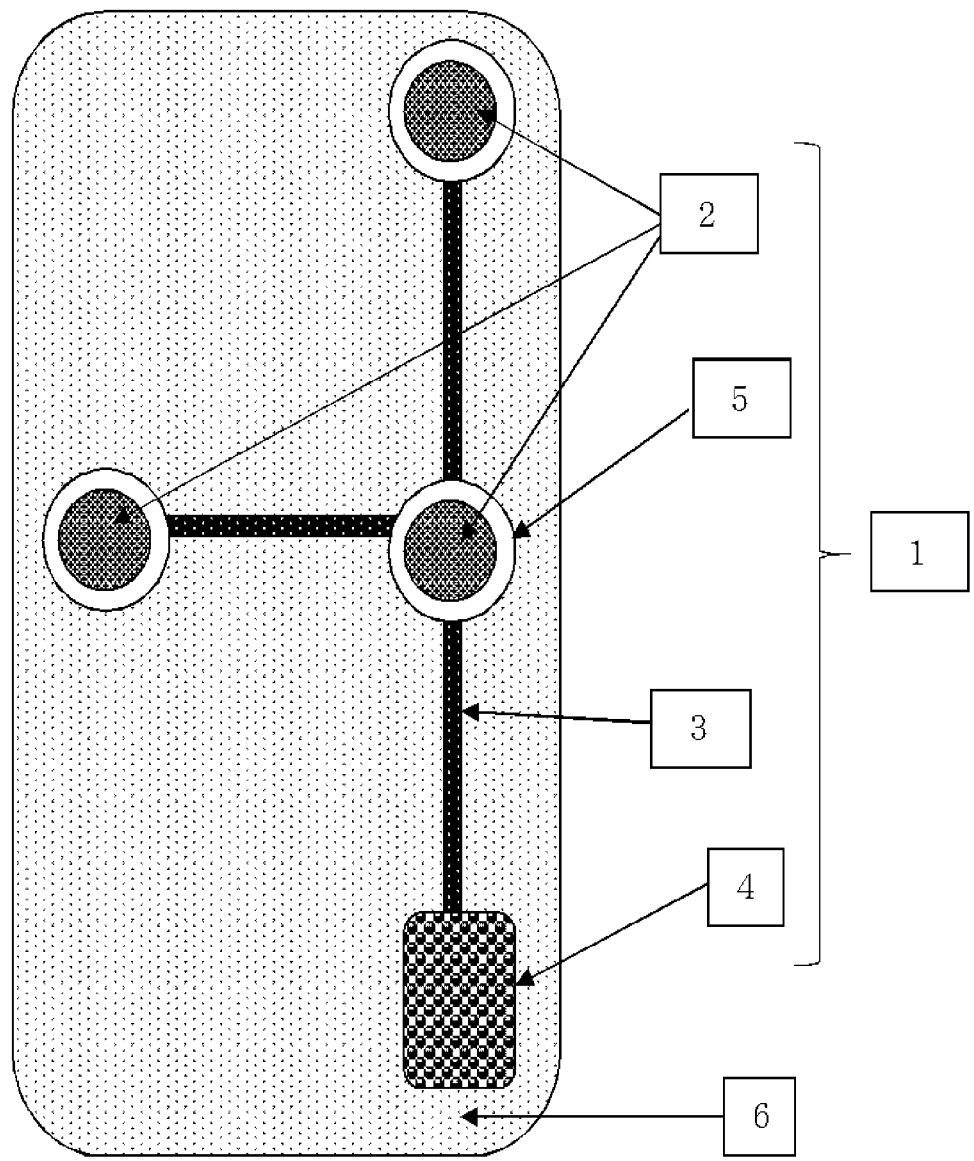

[FIG. 3]
(a)
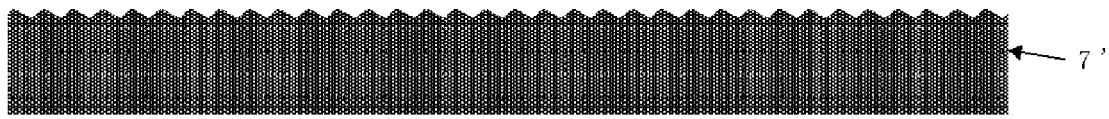
(b)
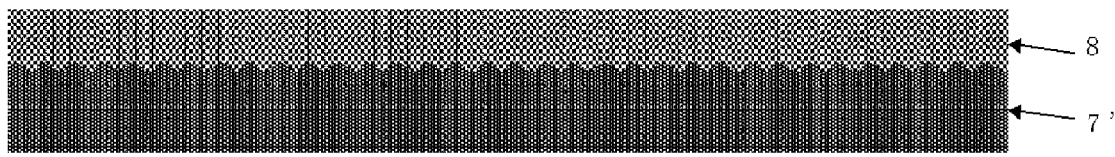
(c)
[FIG. 4]
(a)
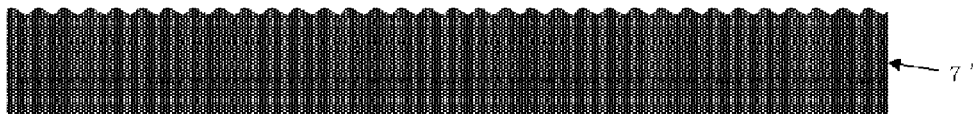
(b)
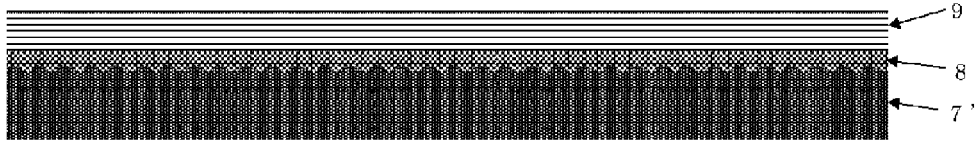
(c)
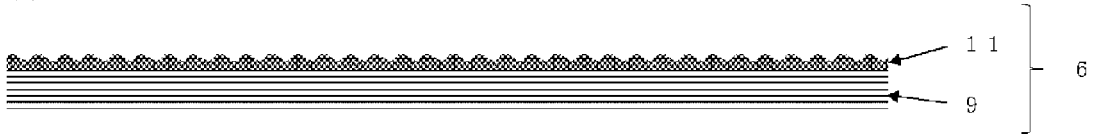

[FIG. 5]
(a)
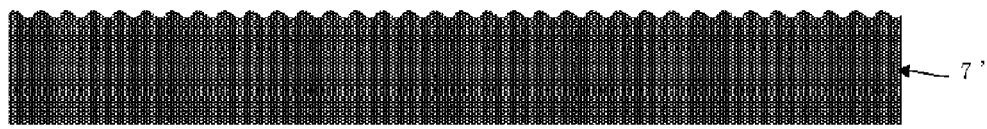
(b)
(c)
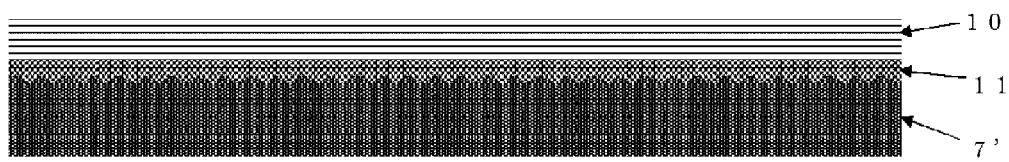
(d)
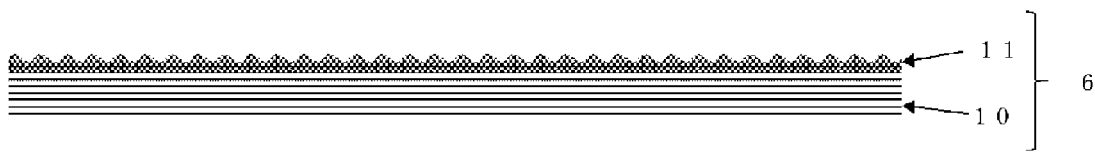
[FIG. 6]
(a)
(b)
(c)
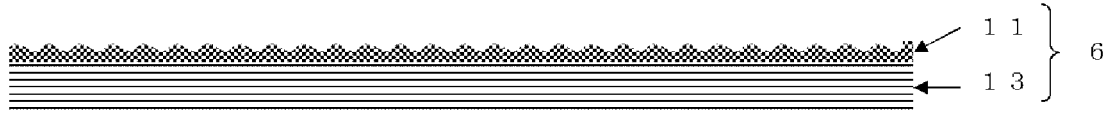

[FIG. 7]
[FIG. 8]
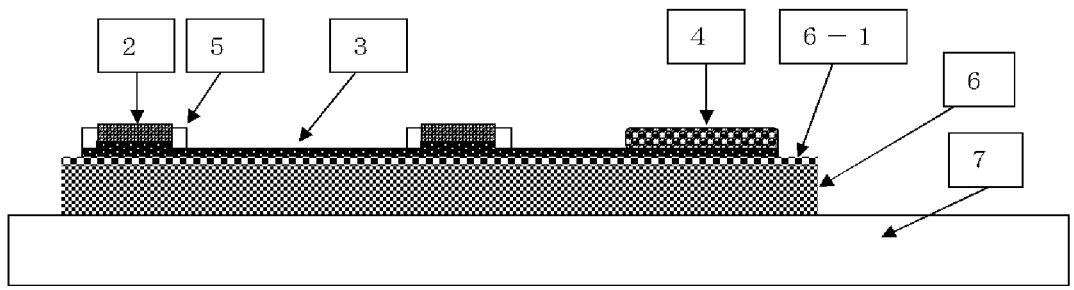
[FIG. 9]
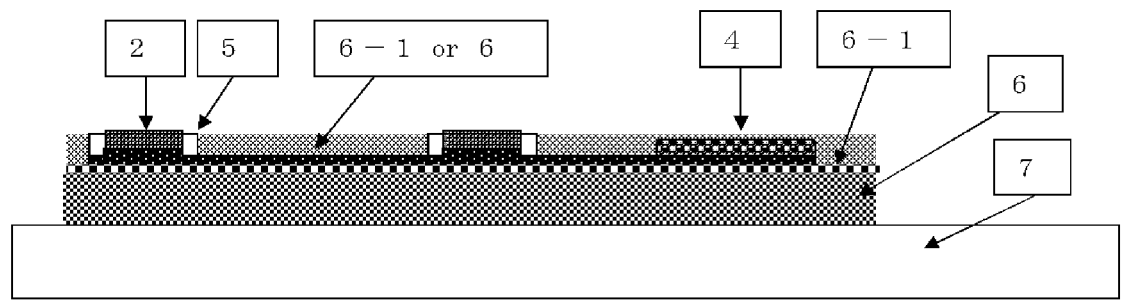
[FIG. 10]

[FIG. 11]
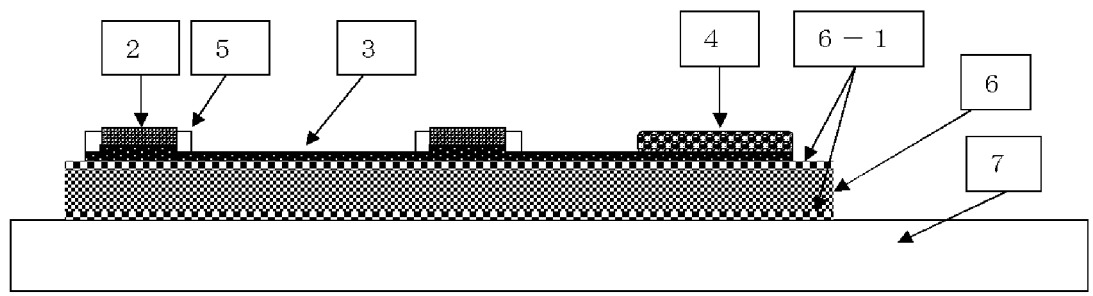
[FIG. 12]
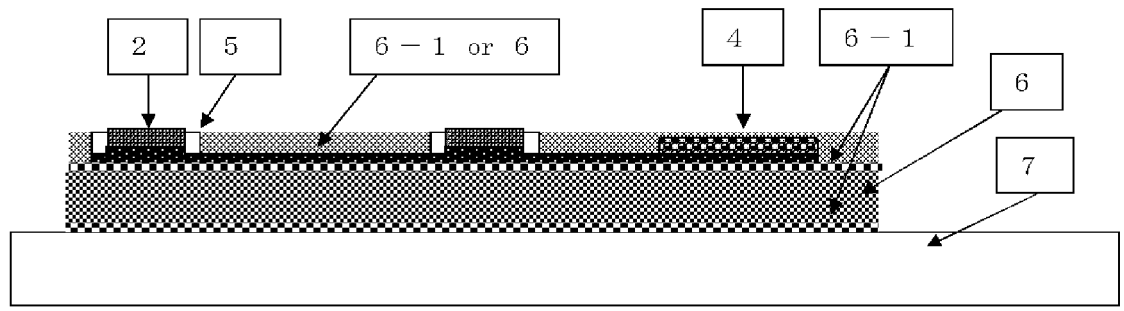

US 11,530,307 B2

STRETCHABLE FILM AND METHOD FOR FORMING THE SAME

TECHNICAL FIELD

The present invention relates to: a stretchable film having properties of high stretchability, high strength, high water repellency, and non-sticky top surface; and a method for forming the stretchable film.

BACKGROUND ART

A recent growing popularity of Internet of Things (IoT) has accelerated the development of such major wearable devices as watches and glasses that allow for Internet access. Even in the fields of medicine and sports, wearable devices for constantly monitoring the user's physical state are increasingly demanded, and such technological development is expected to be further encouraged.

One typical wearable device is attached to the body of a user to constantly monitor the state of physical conditions. The wearable device normally includes a bio-electrode for detecting an electric signal transmitted from a body, wires for sending the electric signal to a sensor, a semiconductor chip serving as a sensor, and a battery, as well as an adhesive pad to be attached to the skin. Patent Document 1 describes detailed structures of a bio-electrode, a wiring part surrounding the bio-electrode, and an adhesive pad. The wearable device disclosed in Patent Document 1 includes a bio-electrode, a silicone-based adhesive film disposed around the bio-electrode, a sensor device, and a meandering-shaped stretchable silver wiring part coated with a stretchable urethane film between the bio-electrode and the sensor device, which are connected by the wiring part.

A urethane film has high stretchability and strength, and excellent mechanical properties as a film coated on a stretchable wiring part. Unfortunately, the hydrolysis inherent in the urethane film lowers its stretchability and strength. Meanwhile, the silicone film has no such hydrolytic nature, but the strength inherently remains low.

Hence, the use of silicone urethane polymers, whose main chain has both a urethane bond and a siloxane bond, has been examined. Advantageously, cured products of the silicone urethane polymer are characterized by higher strength than single silicone and less hydrolytic nature than single polyurethane. Such cured products unfortunately fail to achieve the strength equivalent to single polyurethane and the water repellency equivalent to single silicone, and the strength and water repellency are in-betweens of those inherent in silicone and polyurethane.

Highly stretchable urethane films tend to have a sticky top surface to the touch. The sticky top surface causes difficulty in separating films that are put together, and failure in printing since the film is stuck to a printing plate when screen printing is performed on this film. On the other hand, silicone films have high release characteristics and are prevented from sticking with each other thereby. However, due to the lower strength of silicone, thin silicone films easily break in stretching. When screen printing is performed on a silicone film, failure in printing due to sticking with a printing plate can be avoided, but the lower adhesion to ink causes peeling off of the cured ink. This comes from high release characteristics of a silicone top surface. On the other hand, urethane films have higher adhesion to ink and are prevented from peeling off of the cured ink.

Films using polyurethane with a silicone pendant have well balanced stretchability, strength, and water repellency, but have drawbacks of mutual sticking of the films or sticking to a printing plate in screen printing due to the sticky film top surface. In a film based on polyurethane having a main chain of a silicone block copolymer, the film top surface is free from sticking, but the strength is poor.

Accordingly, it is desirable to develop a stretchable film having higher stretchability and strength without causing sticking of the top surface, on which printing such as screen printing can be performed without peeling off of the printed ink.

A skin sheet material for a bicycle is proposed, having a surface coated with a silicone-urethane film, a urethane film thereunder, and a polyolefin elastomer thereunder (Patent Document 2). With the silicone-urethane film at the outermost surface, the wear resistance is improved. Having lower surface energy, silicone is free from sticking, which improves the wear resistance.

Leaves of lotus do not get wet because of super water repellency exhibited as if water droplets roll like a ball. This is known as the lotus effect. Lotus leaves have fine uneven surface. With this surface being formed of a water repellent material, the super water repellency phenomenon occurs.

CITATION LIST

Patent Literature

Patent Document 1: Japanese Patent Laid-Open Publication No. 2004-033468
Patent Document 2: Japanese Patent Laid-Open Publication No. 2001-18329

SUMMARY OF INVENTION

Technical Problem

Due to these backgrounds, it has been demanded to develop: a self-standing stretchable film having excellent stretchability and strength equivalent to those of polyurethane as well as excellent water repellency equivalent or superior to that of silicone without causing mutual sticking of such stretchable films; and a method for forming the stretchable film.

In view of the circumstances, the present invention aims to provide: a stretchable film that has excellent stretchability and strength, with the film top surface being excellent in water repellency and free from sticking; and a method for forming the stretchable film.

Solution to Problem

To achieve the object, the present invention provides a stretchable film comprising, at least as a top surface of the stretchable film, a cured product of a stretchable film material comprising a silicone polyurethane resin, wherein the top surface of the stretchable film has a repeated uneven pattern formed with depths of 0.1 μm to 2 mm and pitches of 0.1 μm to 5 mm.

Such a stretchable film has excellent stretchability and strength, with the film top surface being excellent in water repellency and free from sticking.

The silicone polyurethane resin preferably has a polycarbonate structure and/or a polyester structure.

Such structures provide such high hardness that the uneven portion is less likely to deform by touching, thereby keeping the super water repellency.

Moreover, the silicone polyurethane resin is preferably a silicone-pendant type polyurethane resin having a structure shown by the following general formula (1):

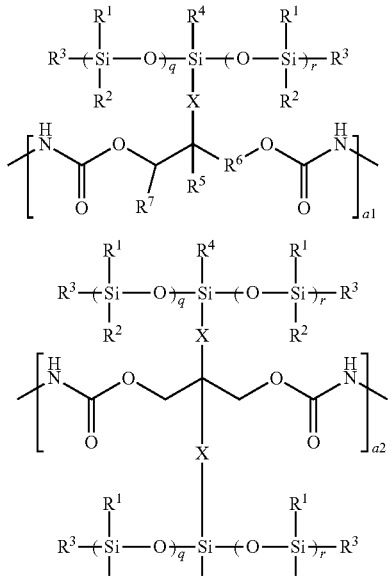

(1)

wherein $R^1$, $R^2$, and $R^3$ may be identical to or different from each other and each represent a linear, branched, or cyclic alkyl group having 1 to 6 carbon atoms, a phenyl group, or a 3,3,3-trifluoropropyl group; $R^4$'s may be identical to or different from each other and each represent a linear, branched, or cyclic alkyl group having 1 to 6 carbon atoms, a phenyl group, a 3,3,3-trifluoropropyl group, or a —$(OSiR^1R^2)_s$—$OSiR^1R^2R^3$ group; $R^5$ represents a hydrogen atom or a linear or branched alkyl group having 1 to 4 carbon atoms; $R^6$ represents a single bond, a methylene group, or an ethylene group; $R^7$ represents a hydrogen atom or a methyl group; X represents a linear or branched alkylene group having 3 to 7 carbon atoms and optionally containing an ether group; "q", "r", and "s" each represent an integer in a range of 0 to 20; and a1 and a2 represent proportions of repeating units and satisfy ranges of $0 \le a1 < 1.0$, $0 \le a2 < 1.0$, and $0 < a1+a2 \le 1.0$.

Such a silicone polyurethane resin enables the stretchable film with more excellent strength.

In this case, the silicone-pendant type polyurethane resin preferably has a structure shown by the following general formula (2):

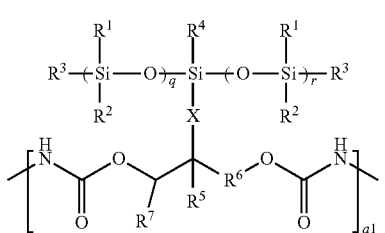

(2)

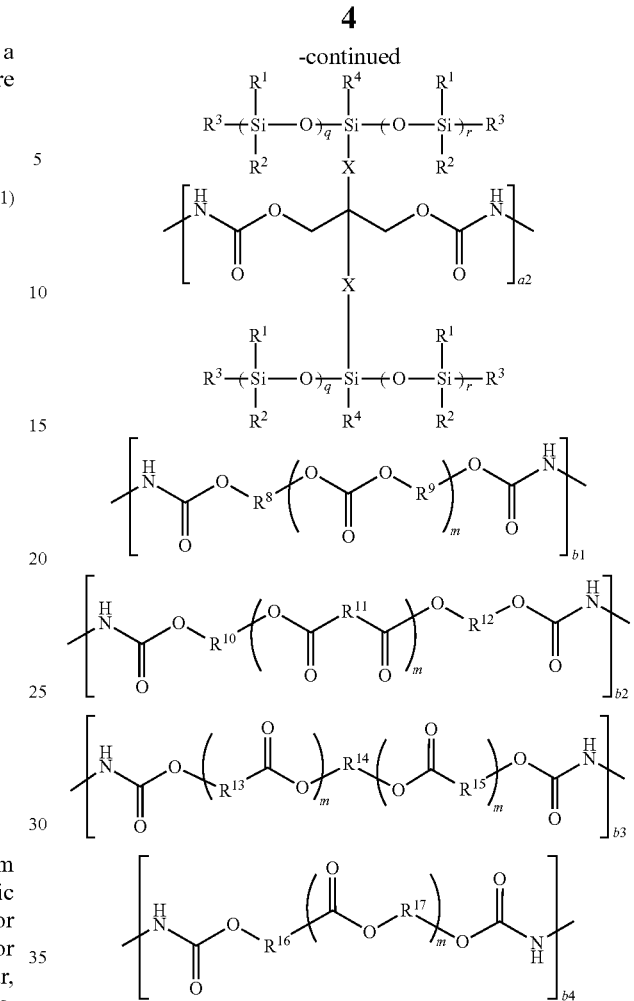

wherein $R^1$ to $R^7$, X, "q", "r", a1, and a2 are as defined above; $R^8$ to $R^{17}$ may be identical to or different from each other and each represent a linear, branched, or cyclic alkylene group having 2 to 12 carbon atoms, or an arylene group having 6 to 12 carbon atoms; "m"s may be identical to or different from each other and each represent 1 to 200; and b1, b2, b3, and b4 represent proportions of repeating units and satisfy ranges of $0 \le b1 < 1.0$, $0 \le b2 < 1.0$, $0 \le b3 < 1.0$, $0 \le b4 < 1.0$, and $0 < b1+b2+b3+b4 < 1.0$.

Such a silicone-pendant type polyurethane resin makes the stretchable film have further improved strength and the film top surface cause less sticking.

Further, in this case, the silicone-pendant type polyurethane resin preferably has a structure shown by the following general formula (3):

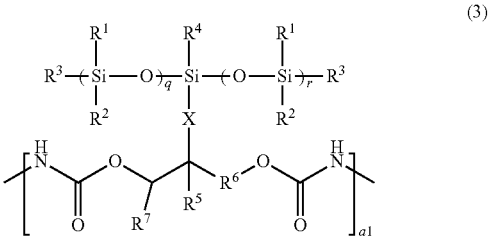

(3)

-continued

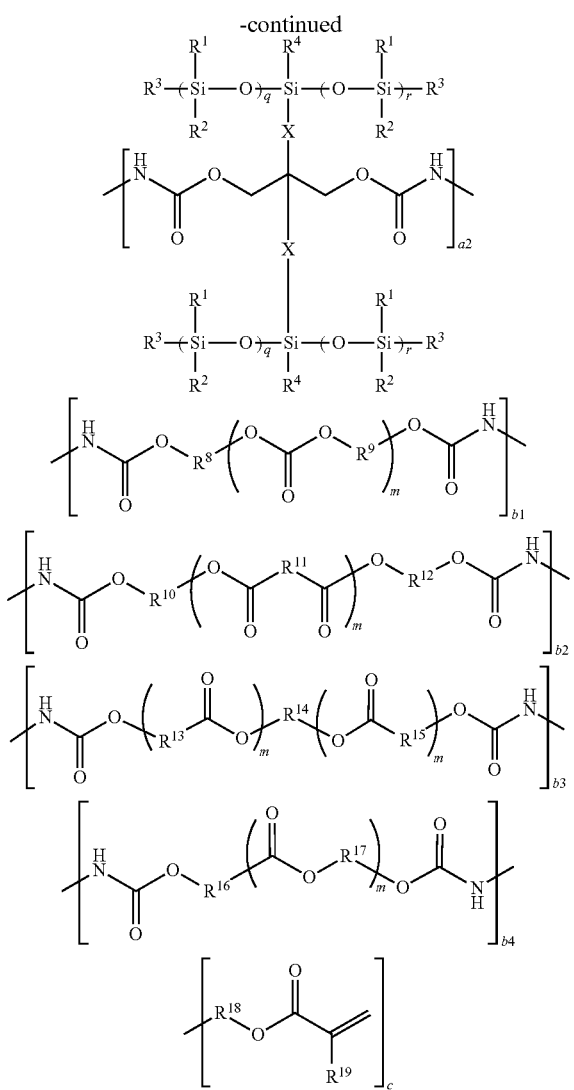

wherein $R^1$ to $R^{17}$, X, "m", "q", "r", a1, a2, b1, b2, b3, and b4 are as defined above; $R^{18}$ represents a linear, branched, or cyclic alkylene group having 1 to 20 carbon atoms and optionally having an ether group or an ester group; $R^{19}$ represents a hydrogen atom or a methyl group; and "c" represents the number of unit in one molecule and satisfies a range of $1 \le c \le 4$.

Such a silicone-pendant type polyurethane resin is particularly suitably cured by heating and/or light irradiation.

The stretchable film preferably has a stretching property in a range of 20 to 1000% in a tensile test stipulated according to JIS K 6251.

With such a stretching property, the inventive stretchable film can be particularly favorably used as a substrate film for a stretchable wiring.

The stretchable film is preferably used as a film in contact with a stretchable conductive wiring.

The inventive stretchable film is particularly suitable for such a use.

The present invention also provides a method for forming a stretchable film, comprising the steps of:

(1) applying a stretchable film material comprising a silicone-pendant type polyurethane resin having a structure shown by the following general formula (1) onto a substrate having a repeated uneven pattern formed with depths of 0.1 μm to 2 mm and pitches of 0.1 μm to 5 mm;

(2) curing the stretchable film material by heating and/or light irradiation; and (3) peeling a cured product of the stretchable film material from the substrate,

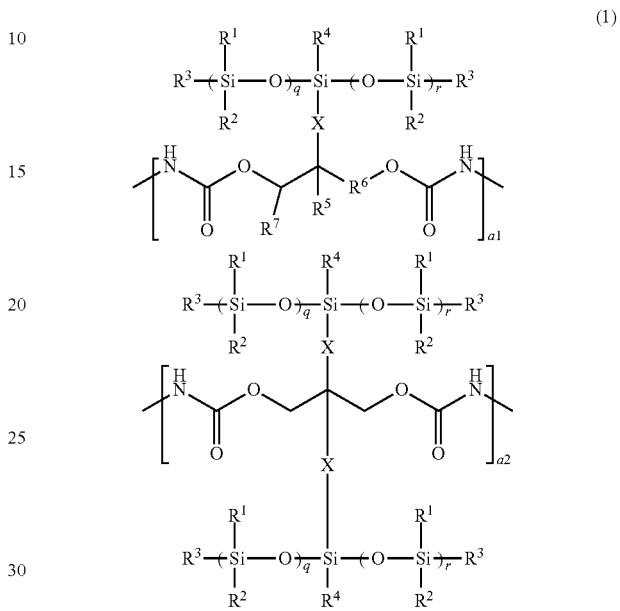

(1)

wherein $R^1$, $R^2$, and $R^3$ may be identical to or different from each other and each represent a linear, branched, or cyclic alkyl group having 1 to 6 carbon atoms, a phenyl group, or a 3,3,3-trifluoropropyl group; $R^4$'s may be identical to or different from each other and each represent a linear, branched, or cyclic alkyl group having 1 to 6 carbon atoms, a phenyl group, a 3,3,3-trifluoropropyl group, or a —$(OSiR^1R^2)_s$—$OSiR^1R^2R^3$ group; $R^5$ represents a hydrogen atom or a linear or branched alkyl group having 1 to 4 carbon atoms; $R^6$ represents a single bond, a methylene group, or an ethylene group; $R^7$ represents a hydrogen atom or a methyl group; X represents a linear or branched alkylene group having 3 to 7 carbon atoms and optionally containing an ether group; "q", "r", and "s" each represent an integer in a range of 0 to 20; and a1 and a2 represent proportions of repeating units and satisfy ranges of $0 \le a1 < 1.0$, $0 \le a2 < 1.0$, and $0 \le a1+a2 \le 1.0$.

Such a method for forming a stretchable film makes it possible to easily form a stretchable film which is, at least as the top surface thereof, a cured product of a stretchable film material containing a silicone polyurethane resin, and the top surface of the stretchable film has the repeated uneven pattern formed with depths of 0.1 μm to 2 mm and pitches of 0.1 μm to 5 mm.

In this event, the inventive method may comprise, between the step (1) and the step (2), (1') a step of pressure-bonding a polyurethane film onto the stretchable film material.

Alternatively, the inventive method may comprise, between the step (2) and the step (3), (2'-1) a step of coating the cured product of the stretchable film material with a stretchable film material containing a polyurethane resin, and (2'-2) a step of curing the stretchable film material containing the polyurethane resin by heating and/or light irradiation to form a polyurethane film.

Such methods for forming a stretchable film make it possible to easily produce a stretchable film which is a laminate of: the top surface having the repeated uneven pattern; and the other portion having a different composition from that of the top surface.

Advantageous Effects of Invention

As described above, the inventive stretchable film is a stretchable film having excellent stretchability and strength equivalent to those of polyurethane, and the film top surface is free from sticking when touched and super water repellent so that water drops can roll on the film top surface. Moreover, in the present invention, the presence of the unevenness on the top surface of the layer based on the silicone pendant polyurethane causes super water repellent phenomenon. The inventive stretchable film not only makes water droplets hardly adhere thereto but also can reduce the adhesion of foreign matters, and the top surface of the inventive stretchable film is free from sticking and has favorable texture. Accordingly, the inventive stretchable film is particularly favorably usable as a stretchable film capable of mounting not only a wiring part for connecting a bio-electrode to a sensor but also all such bio-electrodes and sensor in a wearable device. Further, the inventive method for forming a stretchable film makes it possible to easily form a stretchable film as described above.

BRIEF DESCRIPTION OF DRAWINGS

FIG. 1 is a schematic illustration showing examples of the inventive stretchable film;

FIG. 2 is a schematic illustration of an electrocardiograph formed on the inventive stretchable film, which is viewed from a bio-electrode side;

FIG. 3 illustrates an example of the inventive method for forming a stretchable film;

FIG. 4 illustrates another example of the inventive method for forming a stretchable film;

FIG. 5 illustrates still another example of the inventive method for forming a stretchable film;

FIG. 6 illustrates still another example of the inventive method for forming a stretchable film;

FIG. 7 is a cross-sectional view showing a state where the inventive stretchable film is formed on a substrate;

FIG. 8 is a cross-sectional view showing a state where an electrocardiograph is formed on the inventive stretchable film;

FIG. 9 is a cross-sectional view showing a state where a wire and a center device in FIG. 8 are covered with the silicone-urethane stretchable film;

FIG. 10 is a cross-sectional view showing a state where repeated uneven patterns are formed on both surfaces of the stretchable film;

FIG. 11 is a cross-sectional view showing a state where an electrocardiograph is formed on the stretchable film in FIG. 10; and FIG. 12 is a cross-sectional view showing a state where a wire and a center device in FIG. 11 are covered with the silicone-urethane stretchable film.

DESCRIPTION OF EMBODIMENTS

As described above, there have been demands for the development of: a stretchable film having excellent stretchability and strength, with the film top surface being excellent in water repellency and free from sticking; and a method for forming the stretchable film.

Polyurethane has sufficient stretchability and strength but has such drawbacks that the water repellency is low, and that the strength and stretchability are lowered by hydrolysis. Silicone has high water repellency but a drawback of low strength. Moreover, a cured product of a silicone urethane polymer having a main chain with both a urethane bond and a siloxane bond has a drawback of low strength, although the film top surface has excellent water repellency and hardly has stickiness. A film based on polyurethane having polyether with a silicone-pendant side chain has high strength, high stretchability, and high water repellency, but has a drawback of top surface stickiness. Under this circumstance, it has been desired to develop: a stretchable film having excellent stretchability and strength equivalent to those of polyurethane, as well as excellent water repellency and surface hardness equivalent or superior to those of silicone, with the film top surface having sufficiently high strength; and method for forming the stretchable film.

When silicone rubber is used to prepare a sheet having fine uneven top surface like lotus leaves, the top surface has super water repellency. Nevertheless, this sheet easily breaks by stretching. This is because the tear strength of silicone rubber is so weak that the sheet is torn from the uneven portion by applying a tensile stress to the sheet.

A polyurethane sheet has high strength, and when the sheet is prepared to have fine uneven top surface, the sheet does not break by stretching. Nevertheless, polyurethane does not have high water repellency, so that no super water repellent phenomenon occurs on the uneven top surface.

Consequently, it has been found that when a sheet having fine uneven top surface is prepared using silicone polyurethane, a stretchable film is obtained which has excellent stretchability and strength, with the film top surface being excellent in water repellency and free from sticking. The stretchable film is particularly suitable as a stretchable substrate film to form a stretchable wiring in a wearable device. These findings have led to the completion of the present invention.

Thus, the present invention is a stretchable film comprising, at least as a top surface of the stretchable film, a cured product of a stretchable film material comprising a silicone polyurethane resin, wherein the top surface of the stretchable film has a repeated uneven pattern formed with depths of 0.1 μm to 2 mm and pitches of 0.1 μm to 5 mm.

Hereinafter, the present invention will be described in detail. However, the present invention is not limited thereto.

<Stretchable Film>

The inventive stretchable film is a stretchable film made of, at least as a top surface of the stretchable film, a cured product of a stretchable film material containing a silicone polyurethane resin, and the top surface of the stretchable film has a repeated uneven pattern formed with depths of 0.1 μm to 2 mm and pitches of 0.1 μm to 5 mm. Note that the repeated uneven pattern can be formed with depths of 0.1 to 100 μm and pitches of 0.1 to 100 μm.

FIG. 1 shows a schematic illustration showing an example of the inventive stretchable film. As shown in FIG. 1(a), a stretchable film 6 of the present invention may be such that the entire film is a cured product 11 of a stretchable film material containing a silicone polyurethane resin. In this case, the top surface formed to have the repeated uneven pattern and the other portion may be formed from different compositions or the same composition. Alternatively, as shown in FIG. 1(b), only the top surface of the stretchable film 6 may be the cured product 11 of a stretchable film material containing a silicone polyurethane resin. Meanwhile, the composition of a portion 12 other than the top surface is not particularly limited as long as the portion 12 is stretchable. Alternatively, only a top surface and a bottom surface of the stretchable film 6 may be formed from the cured product of a stretchable film material containing a silicone polyurethane resin. Note that the repeated uneven pattern may be formed not only on the top surface but also on the bottom surface.

The material for forming the top surface (surface layer) having the repeated uneven pattern formed thereon is preferably a stretchable film material containing a silicone pendant polyurethane resin with polycarbonate and/or polyester soft segments to be described later (polycarbonate and/or polyester silicone polyurethane layers). Since this material has high hardness, the uneven portion is less likely to deform by touching, so that the super water repellency is maintained. Particularly, when constituted such that the portion other than the top surface having the repeated uneven pattern is a cured product of a stretchable film material containing a polyurethane resin containing a polyether soft segment with higher stretchability and high strength while the top surface portion having the uneven pattern is a cured product of a stretchable film material containing a silicone pendant polyurethane resin containing polycarbonate and/or polyester soft segments, an excellent stretchable film is obtained which has the highest stretchability, highest strength, and highest water repellency, and the top surface of which is free from sticking without causing mutual sticking of such stretchable films.

<Silicone Polyurethane Resin>

The silicone polyurethane resin is not particularly limited. For example, a silicone-pendant type polyurethane resin having a structure shown by the following general formula (1) is preferable:

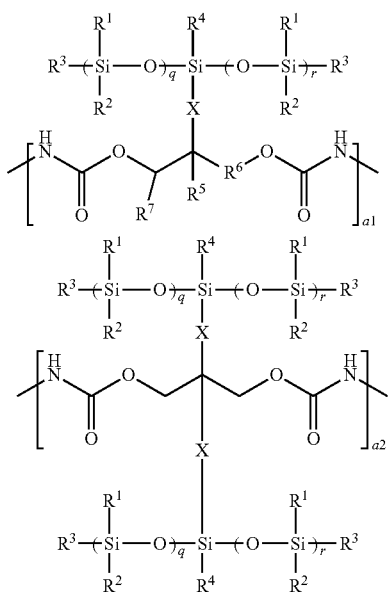

(1)

where $R^1$, $R^2$, and $R^3$ may be identical to or different from each other and each represent a linear, branched, or cyclic alkyl group having 1 to 6 carbon atoms, a phenyl group, or a 3,3,3-trifluoropropyl group; $R^4$'s may be identical to or different from each other and each represent a linear, branched, or cyclic alkyl group having 1 to 6 carbon atoms, a phenyl group, a 3,3,3-trifluoropropyl group, or a —(OSiR$^1$R$^2$)$_s$—OSiR$^1$R$^2$R$^3$ group; $R^5$ represents a hydrogen atom or a linear or branched alkyl group having 1 to 4 carbon atoms; $R^6$ represents a single bond, a methylene group, or an ethylene group; $R^7$ represents a hydrogen atom or a methyl group; X represents a linear or branched alkylene group having 3 to 7 carbon atoms and optionally containing an ether group; "q", "r", and "s" each represent an integer in a range of 0 to 20; and a1 and a2 represent proportions of repeating units and satisfy ranges of $0 \le a1 < 1.0$, $0 \le a2 < 1.0$, and $0 < a1 + a2 \le 1.0$.

The silicone pendant polyurethane has polyurethane as the main chain, and hence has high strength and high stretchability. The minimum pendant silicone chain produces high water repellent property. These enable properties of high strength, high stretchability, and high water repellency. Thus, the silicone pendant polyurethane is preferable as the silicone polyurethane resin used in the present invention.

In this case, the silicone-pendant type polyurethane resin is preferably a polycarbonate and/or polyester silicone polyurethane resin having a structure shown by the following general formula (2):

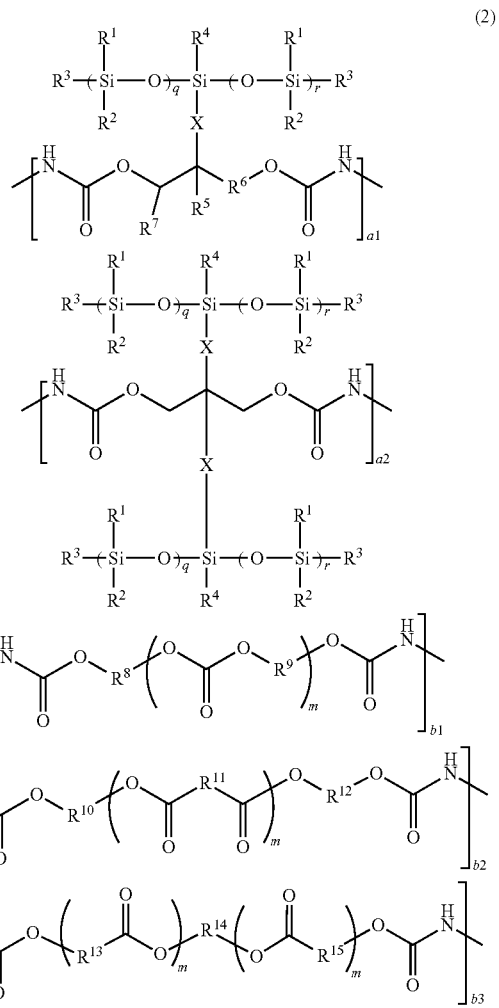

(2)

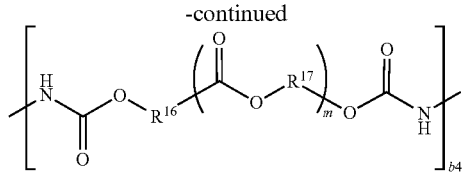

where $R^1$ to $R^7$, X, "q", "r", a1, and a2 are as defined above; $R^8$ to $R^{15}$ may be identical to or different from each other and each represent a linear, branched, or cyclic alkylene group having 2 to 12 carbon atoms, or an arylene group having 6 to 12 carbon atoms; "m"s may be identical to or different from each other and each represent 1 to 200; and b1, b2, b3, and b4 represent proportions of repeating units and satisfy ranges of $0 \le b1 < 1.0$, $0 \le b2 < 1.0$, $0 \le b3 < 1.0$, $0 \le b4 < 1.0$, and $0 < b1+b2+b3+b4 < 1.0$.

Further, in this case, the polycarbonate silicone polyurethane resin preferably has a structure shown by the following general formula (3), including (meth)acrylate:

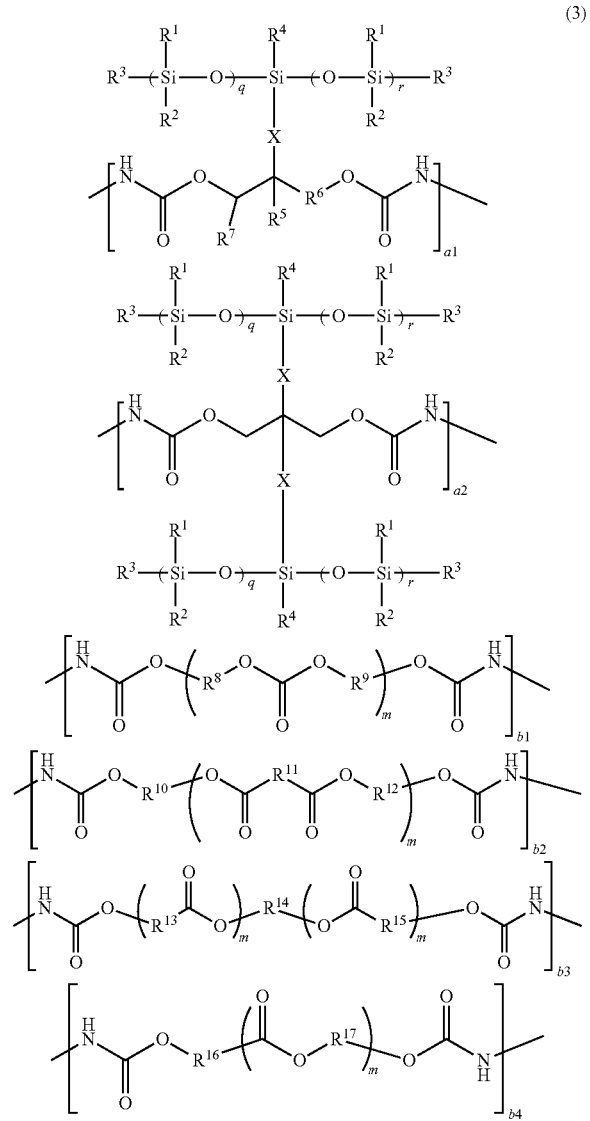

(3)

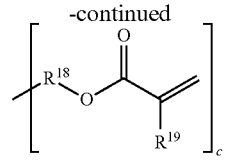

where $R^1$ to $R^{17}$, X, "m", "q", "r", a1, a2, b1, b2, b3, and b4 are as defined above; $R^{18}$ represents a linear, branched, or cyclic alkylene group having 1 to 20 carbon atoms and optionally having an ether group or an ester group; $R^{19}$ represents a hydrogen atom or a methyl group; and "c" represents the number of unit in one molecule and satisfies a range of $1 \le c \le 4$.

To the silicone polyurethane resin used in the present invention, a soft segment can be introduced. When polyether is used as a soft segment, the silicone polyurethane resin has higher stretchability, higher strength, and higher water repellency, while the film top surface is more likely to deform and stickier to the touch. When polycarbonate is used as a soft segment as described above, the high water repellency of the silicone polyurethane resin does not change, and the stretchability is lower than that when polyether is used. However, the strength is improved, high hardness is achieved, and the film top surface hardly deforms and is less sticky. Additionally, a polyester soft segment brings high water repellency, and the resulting mechanical property is intermediate between those of polyether and polycarbonate.

Examples of a diol compound for forming the structure (repeating unit) shown by a1 in the general formula (1) include a compound shown by the following general formula (a)-1'.

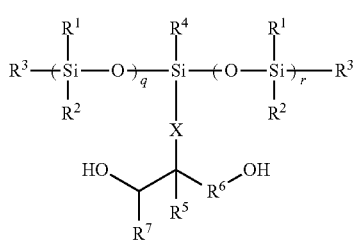

(a)-1'

$R^1$, $R^2$, and $R^3$ are as defined above, and may be identical to or different from each other. Preferable examples thereof include a methyl group, an ethyl group, an n-propyl group, an isopropyl group, an n-butyl group, an isobutyl group, a tert-butyl group, an n-pentyl group, a cyclopentyl group, an n-hexyl group, a cyclohexyl group, a phenyl group, and a 3,3,3-trifluoropropyl group. $R^4$ to $R^7$, X, "q", and "r" are as defined above.

The diol compound having a short chain silicone pendant shown by the general formula (a)-1' can be obtained, for example, by reaction of glycerin monoallyl ether and a short-chain siloxane compound having a SiH group under a platinum catalyst. Specific examples of the diol compound include the following.

13
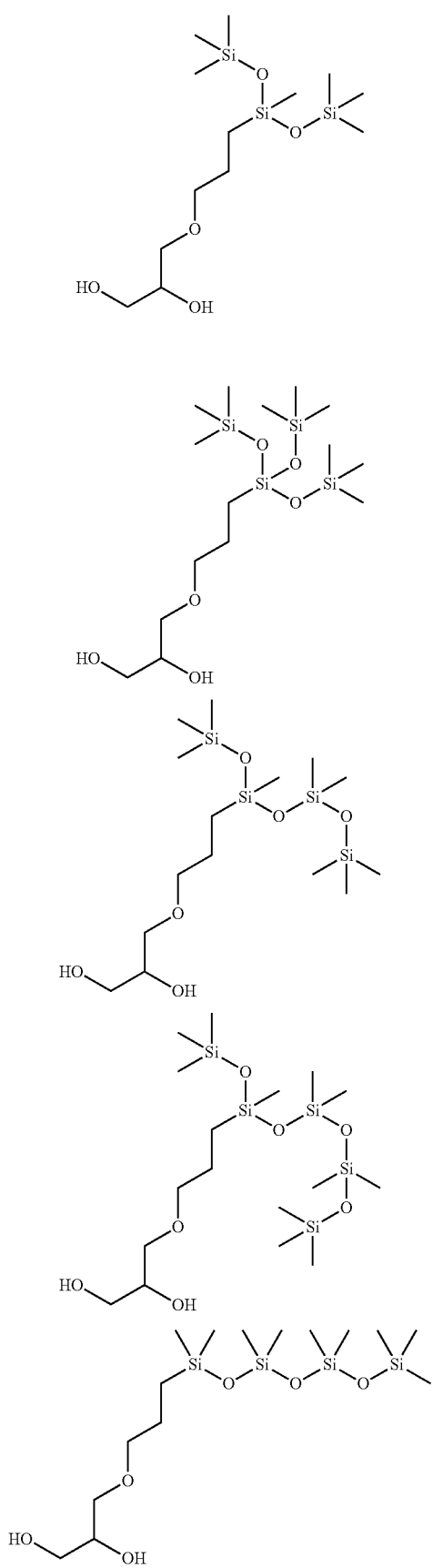
14
-continued
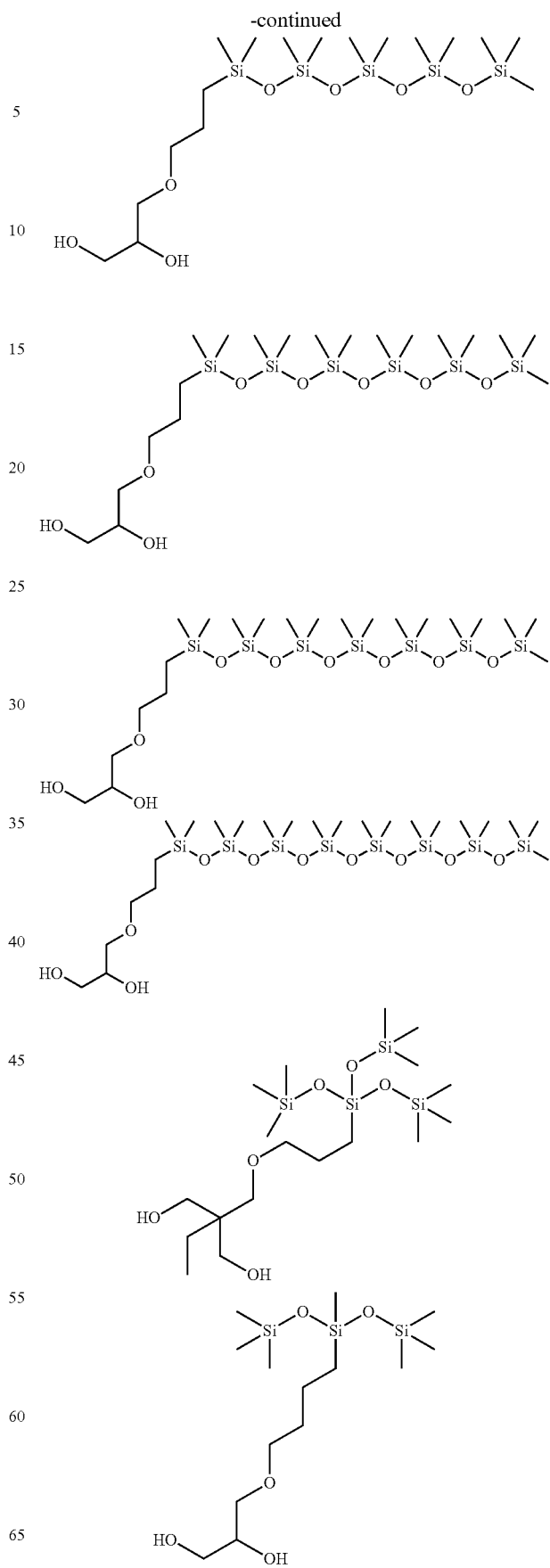

-continued
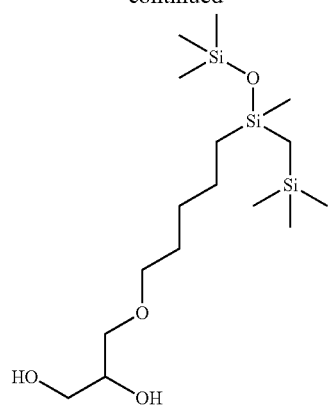
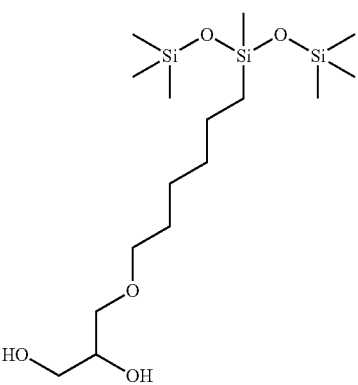
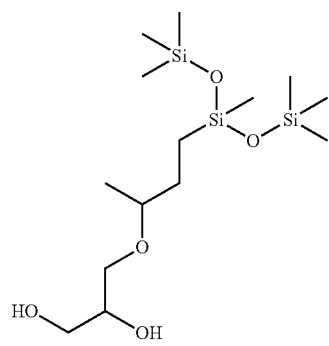
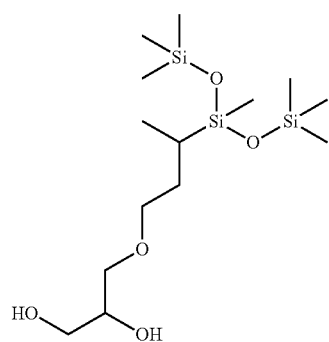
-continued
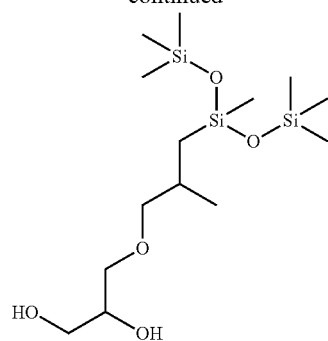
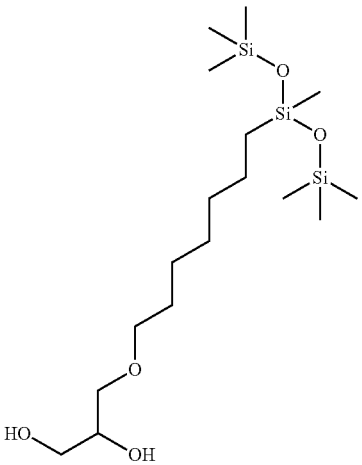
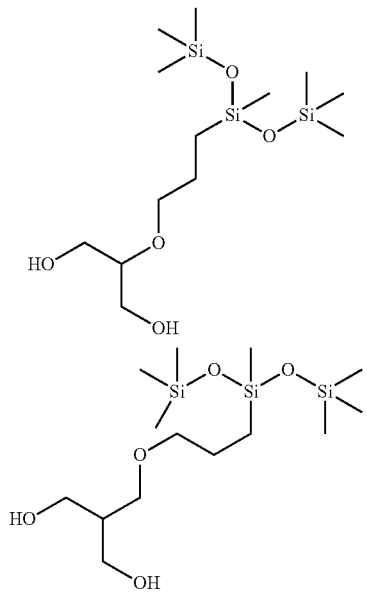
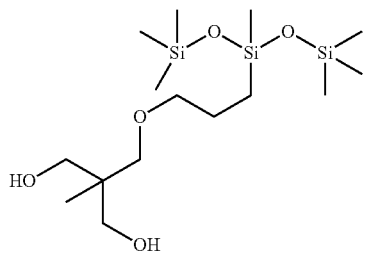

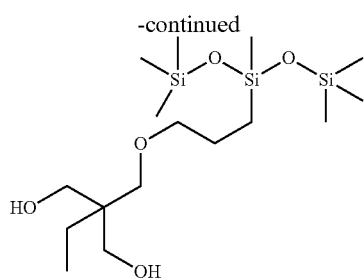

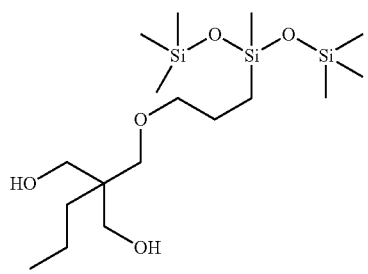

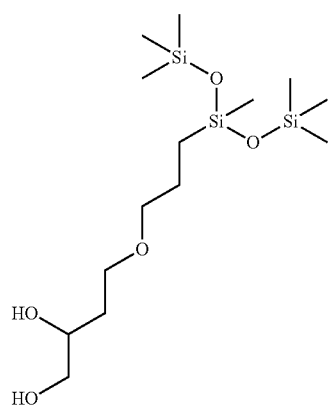

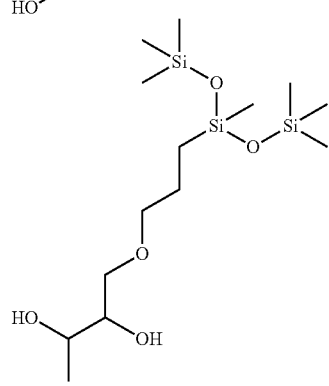

Examples of a diol compound for forming the structure (repeating unit) shown by a2 in the general formula (1) include a compound shown by the following general formula (a)-2':

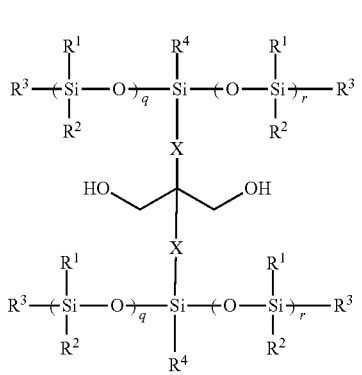

where $R^1$ to $R^4$, X, "q", and "r" are as defined above.

The diol compound having short chain silicone pendants shown by the general formula (a)-2' can be obtained, for example, by reaction of a dihydroxy dialkenyl compound and a short-chain siloxane compound having a SiH group under a platinum catalyst. Specific examples of the diol compound include the following.

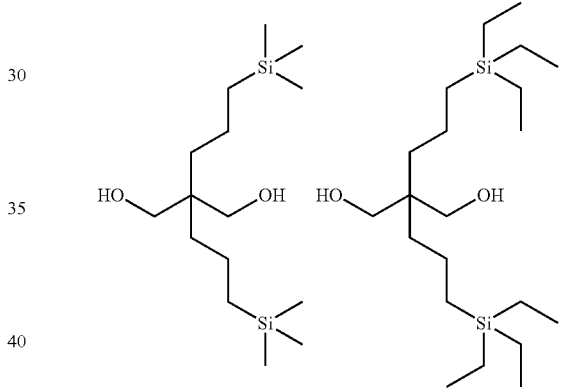

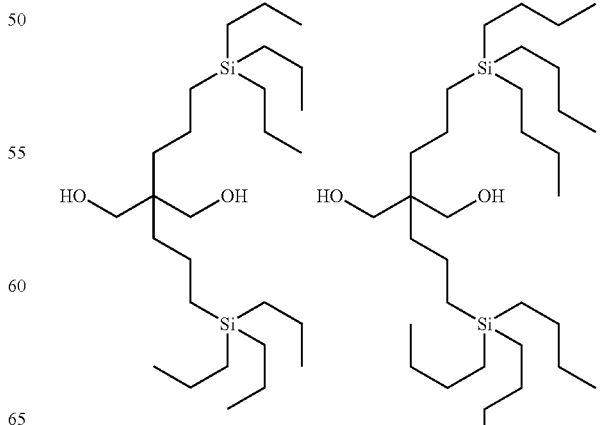

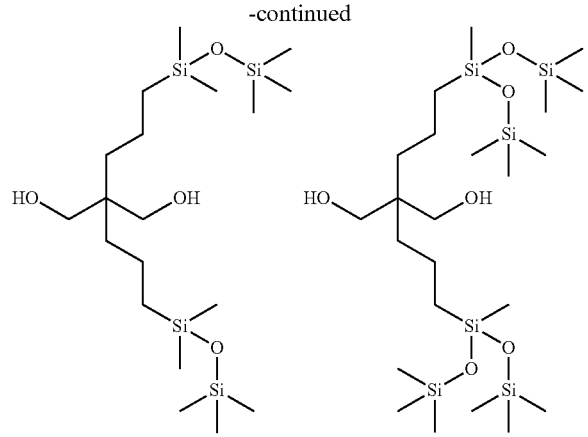
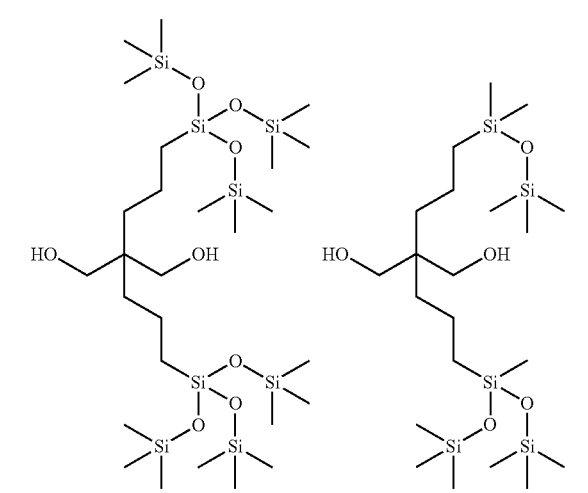
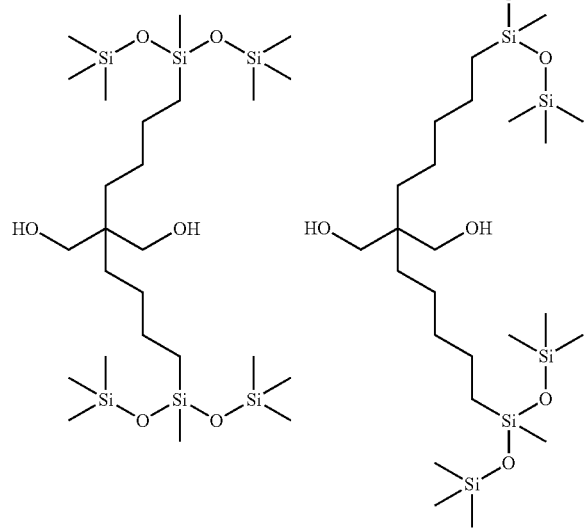
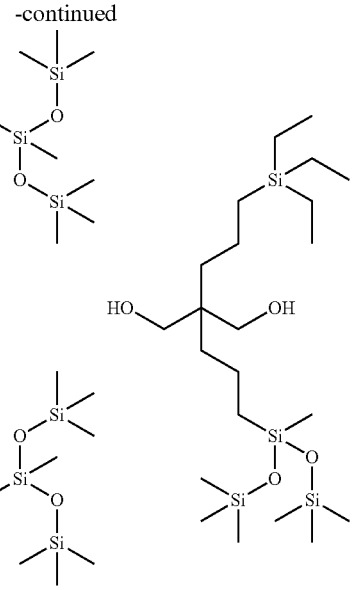
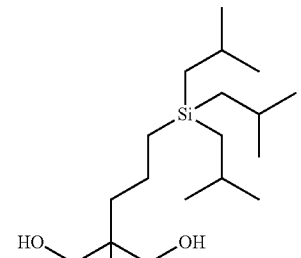
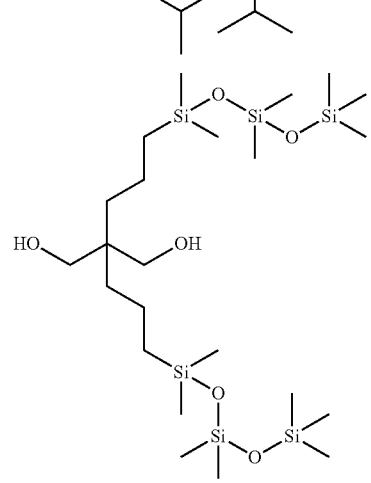

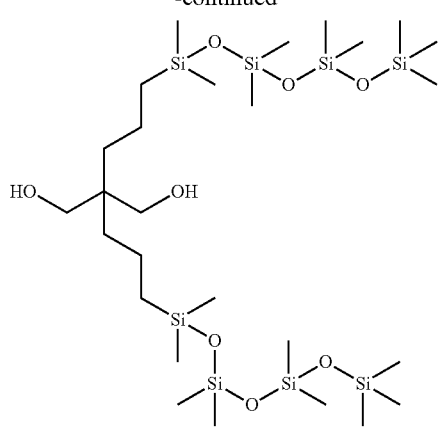
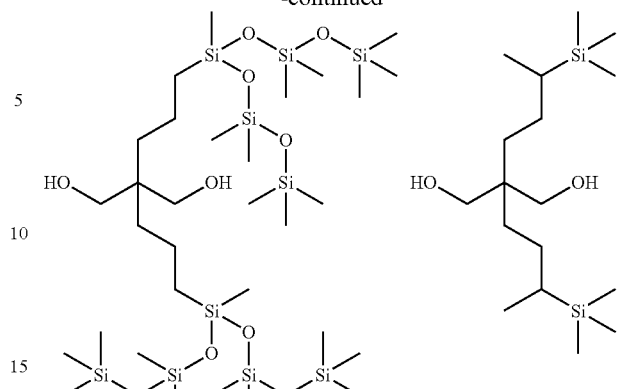
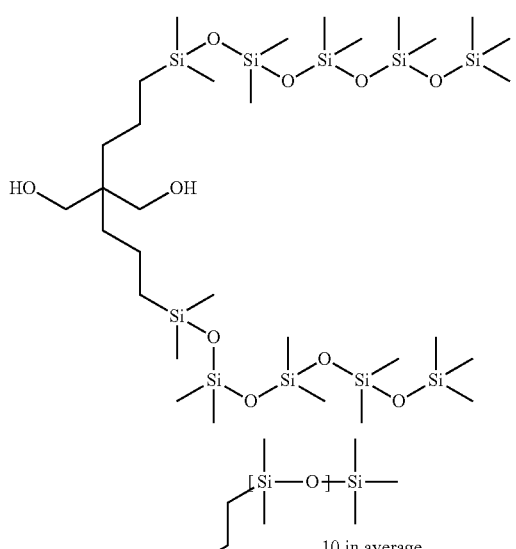
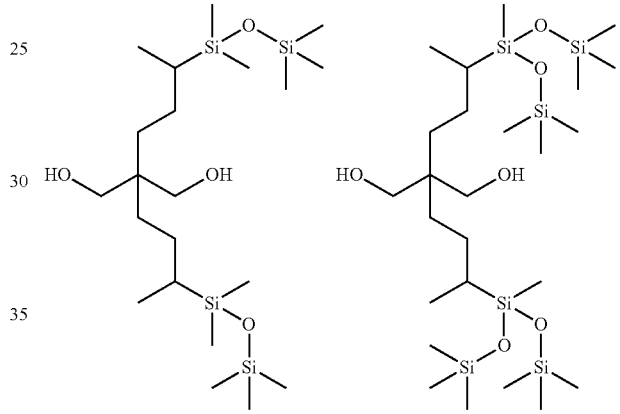
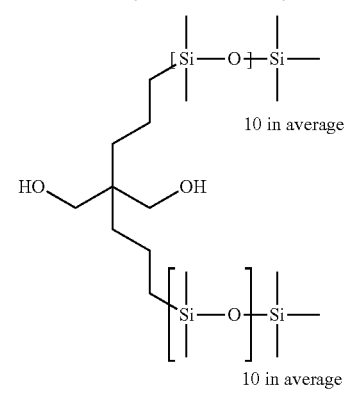
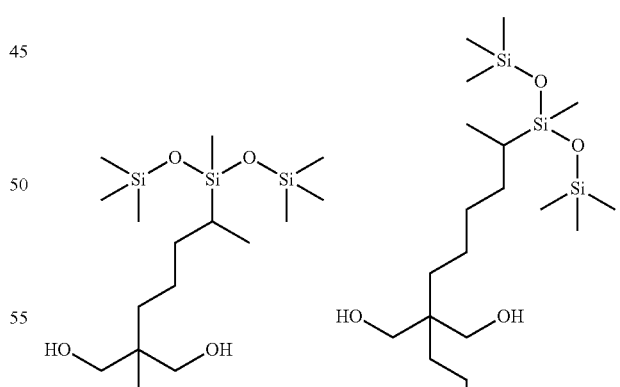
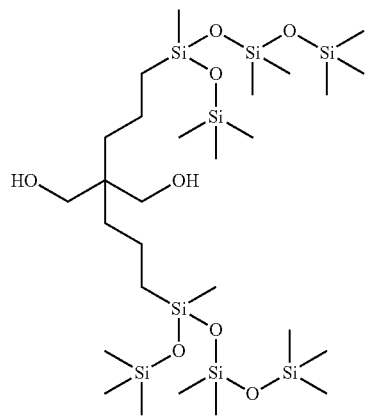
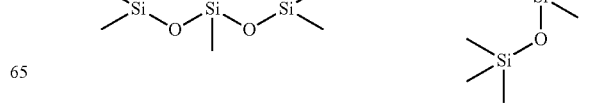

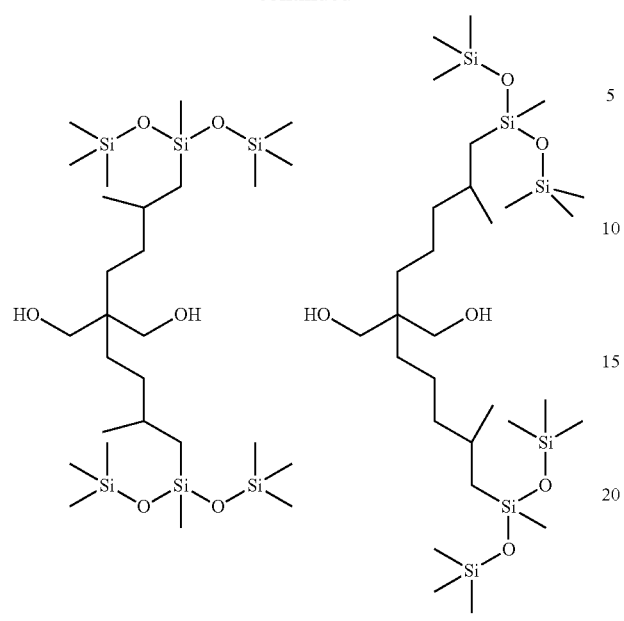
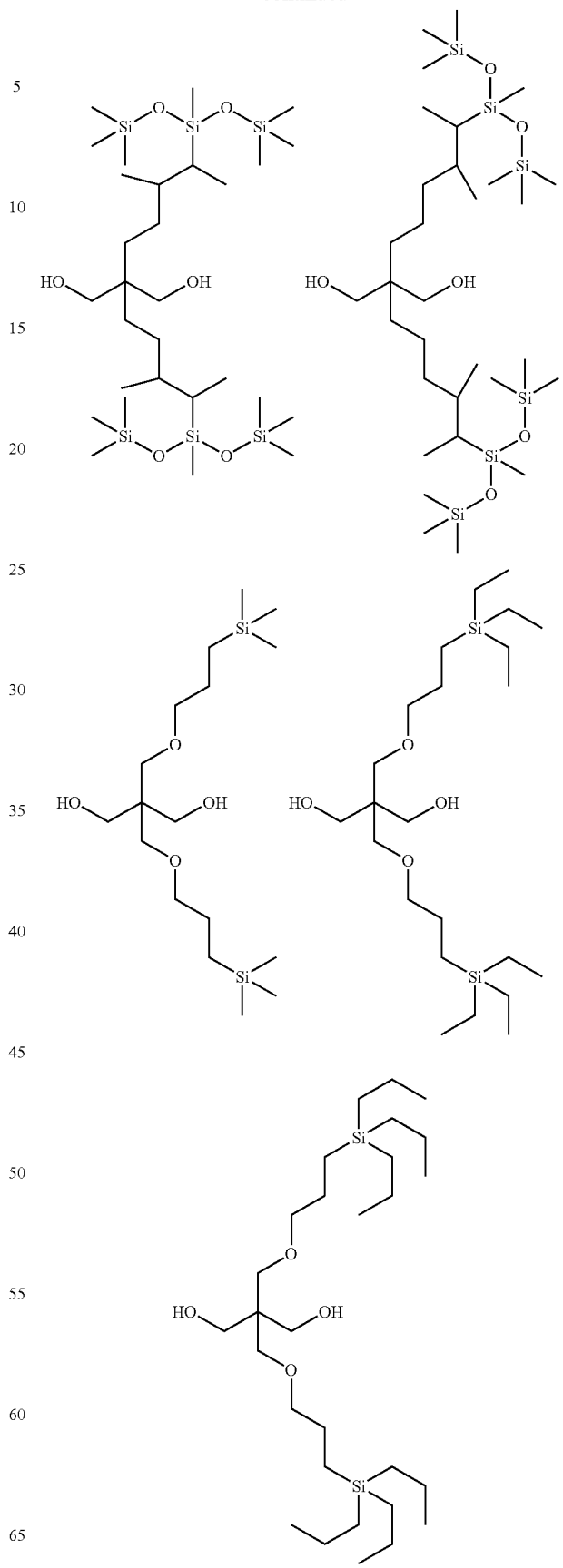

-continued
25
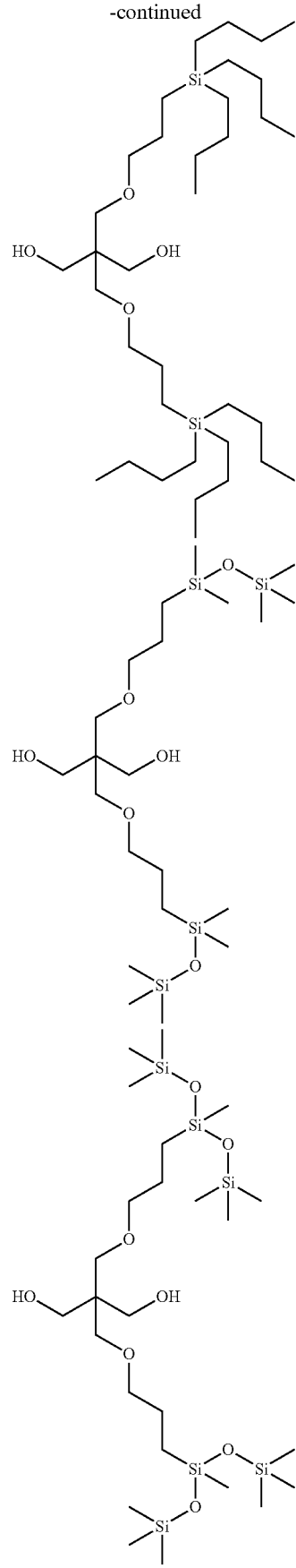
26
-continued

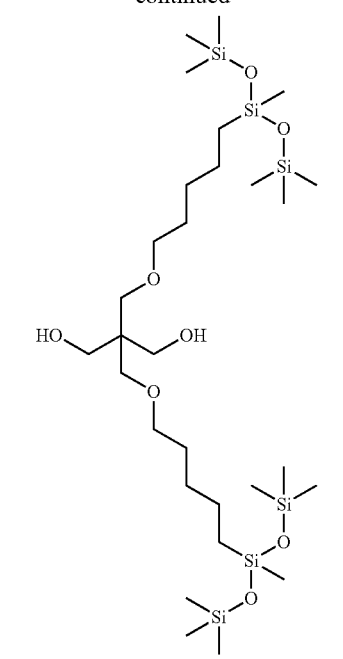
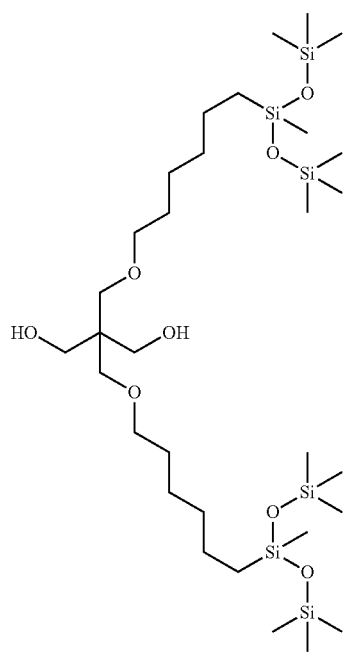
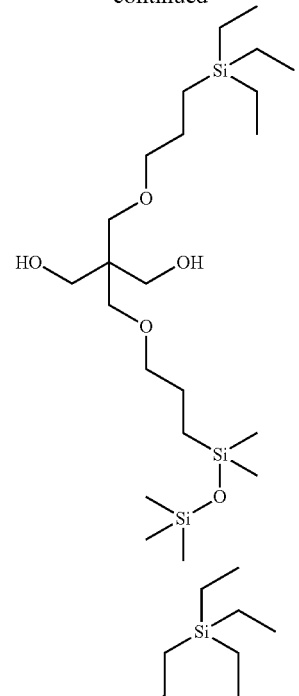
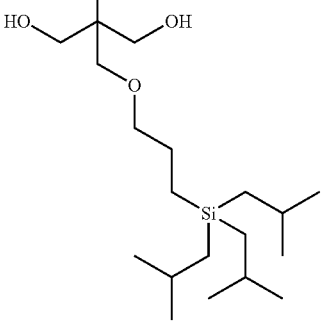

-continued
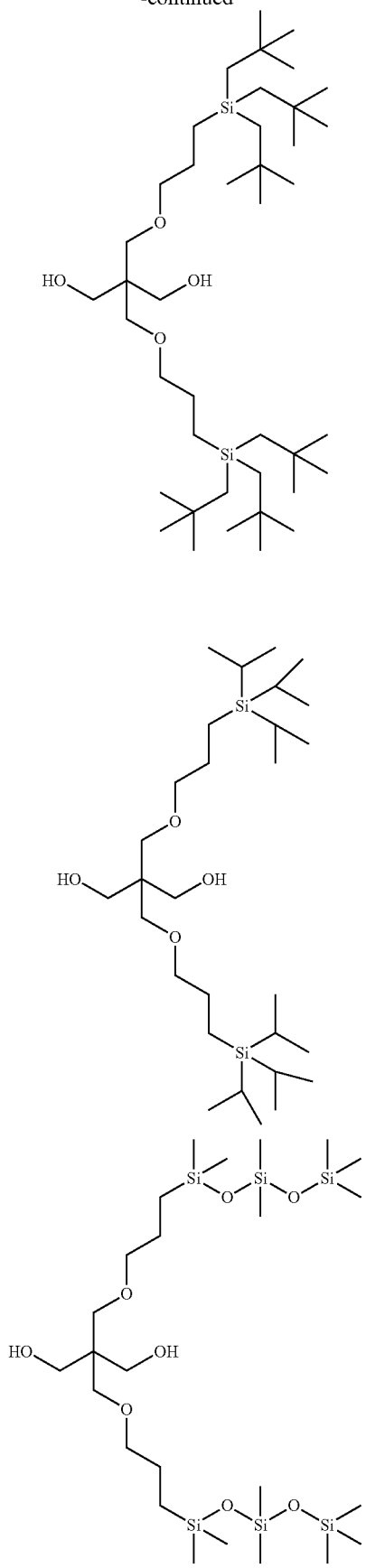
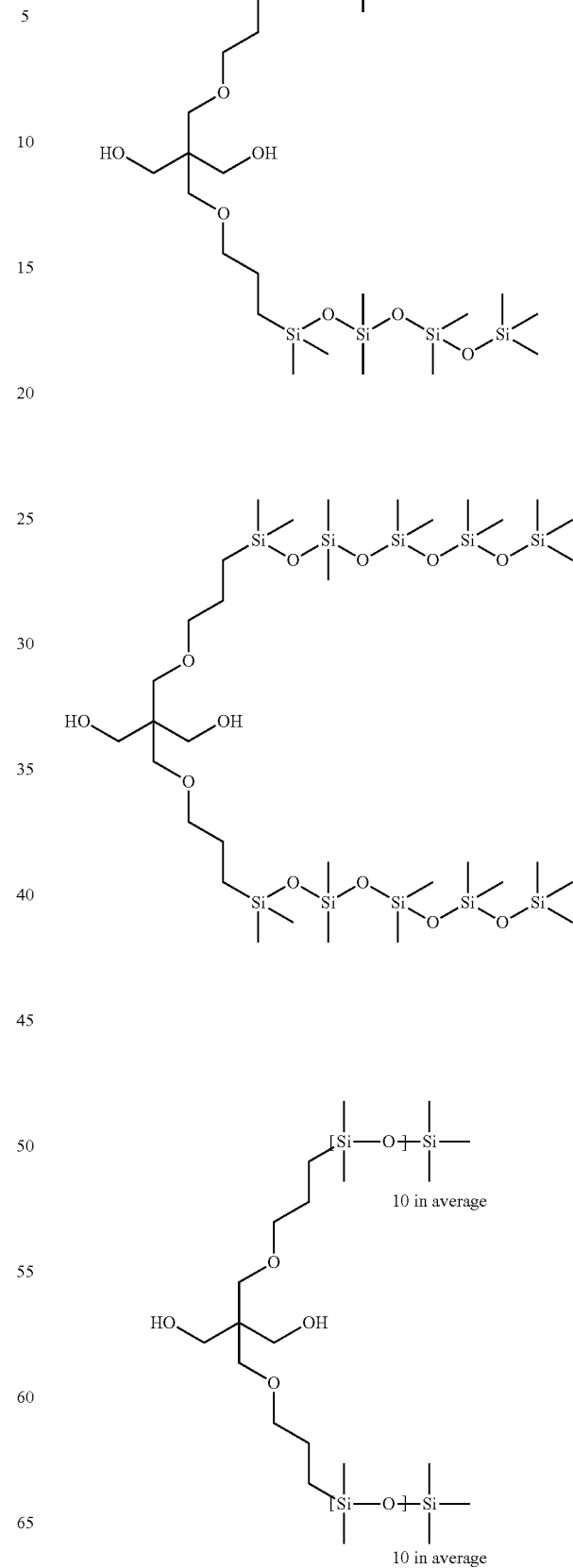

31
-continued
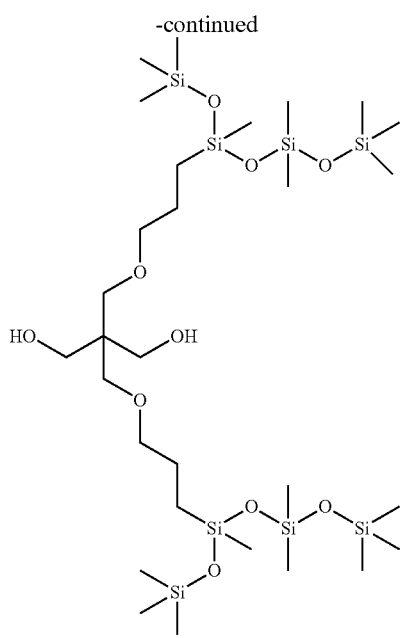
32
-continued
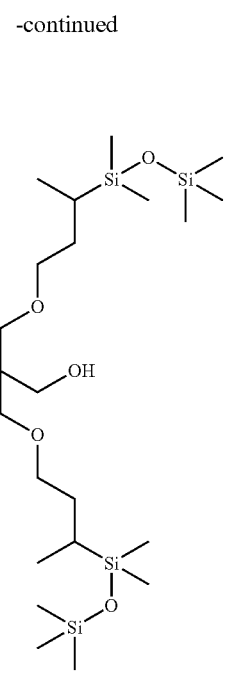
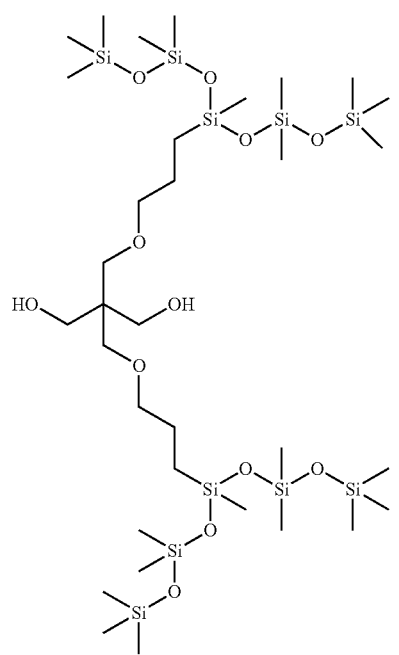
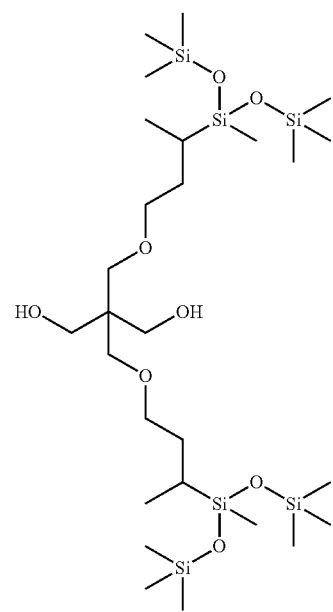

33
-continued
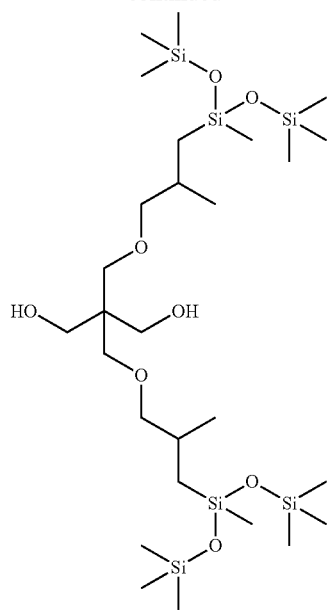
34
-continued
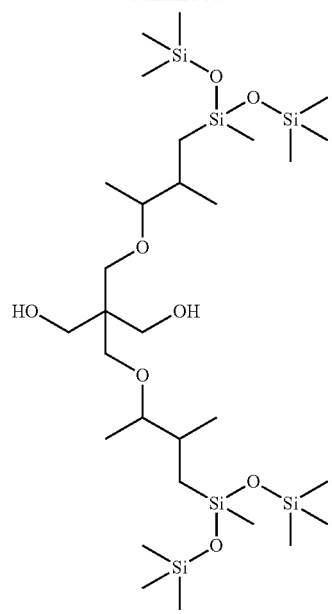
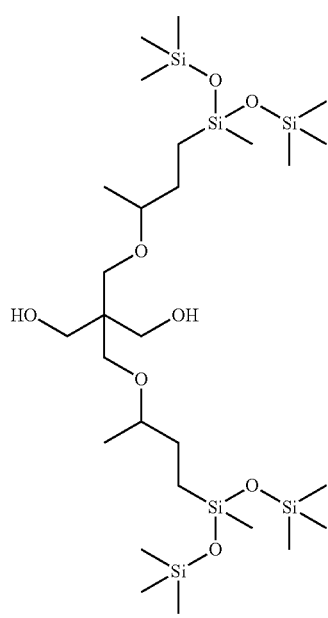
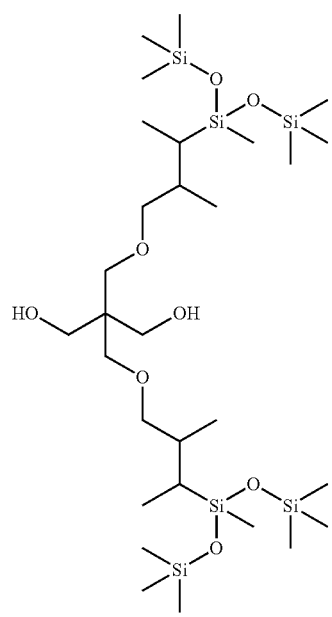

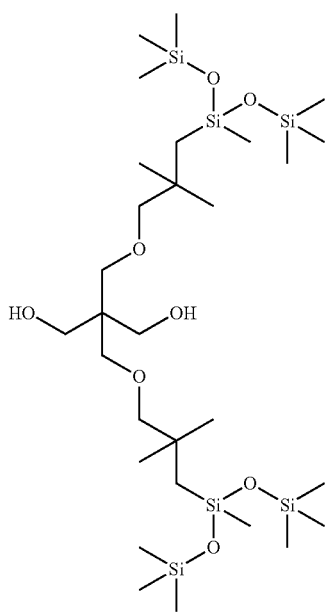 [SMILES: CC(C)(COCC(CO)(CO)COCC(C)(C)C[Si](C)(O[Si](C)(C)C)O[Si](C)(C)C)C[Si](C)(O[Si](C)(C)C)O[Si](C)(C)C]

To obtain the polycarbonate soft segment of the repeating unit b1 in the general formula (2), terminal diol polycarbonate compounds illustrated below can be used as the raw material.

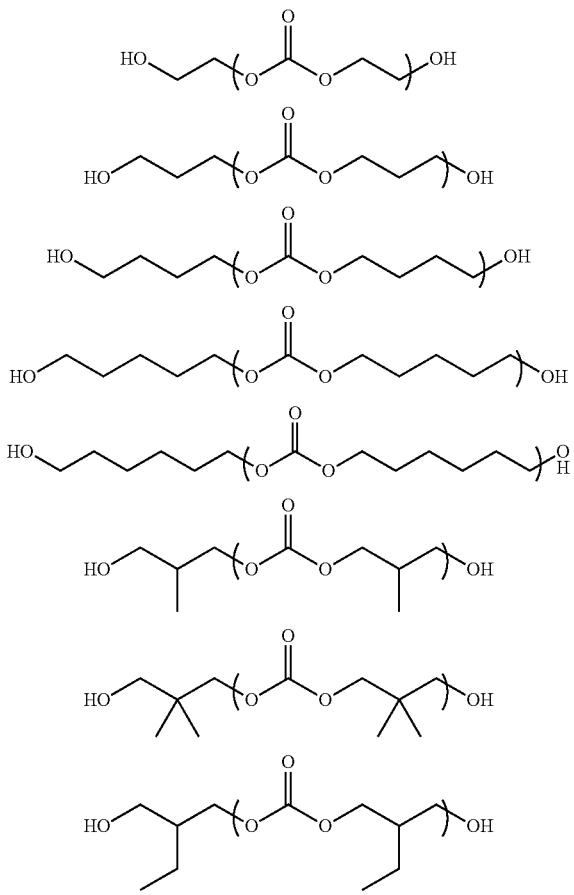

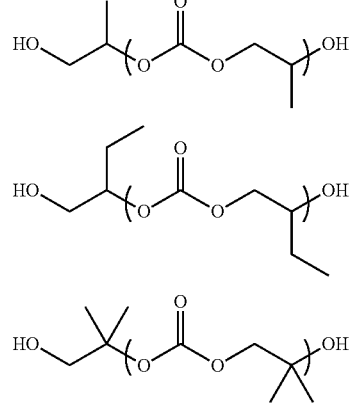

Here, the numbers of the parenthesized repeating units are 1 to 200.

Examples of a terminal diol polyester compound for obtaining the copolymerizable polyester soft segment b2 include the following.

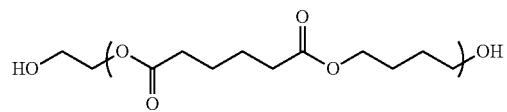
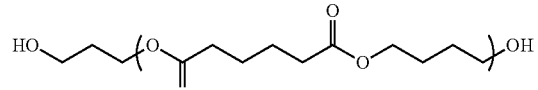
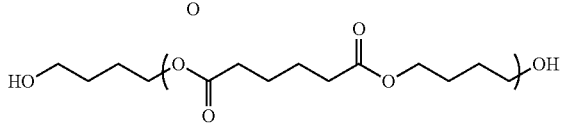
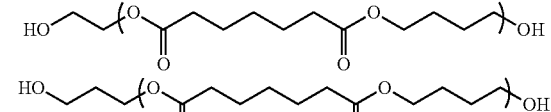
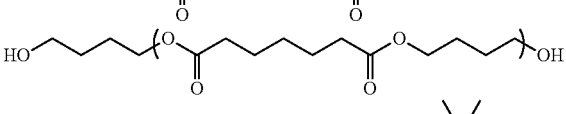
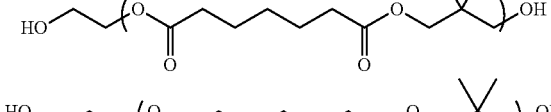
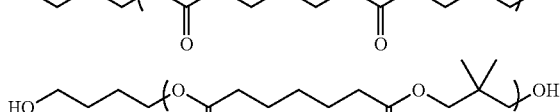
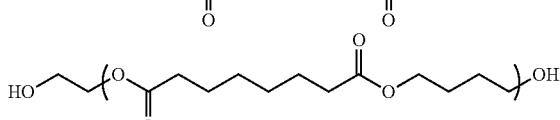
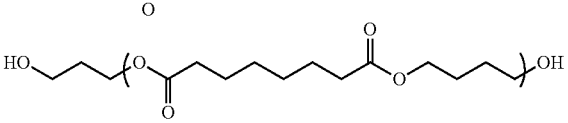

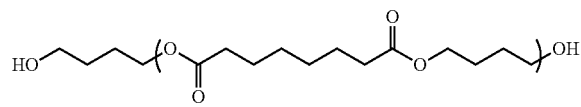

Examples of a terminal diol polyester compound for obtaining the copolymerizable polyester soft segment b3 include the following.

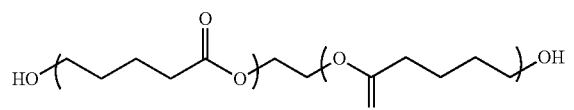
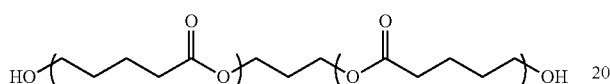
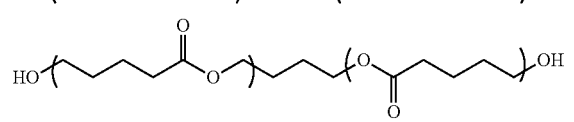
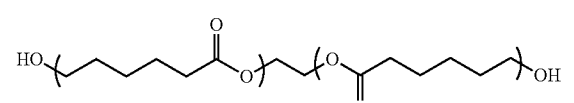
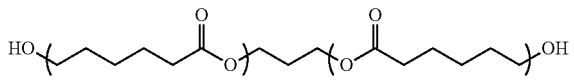
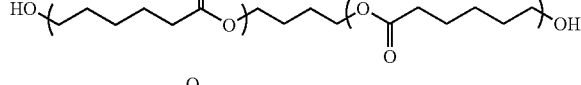
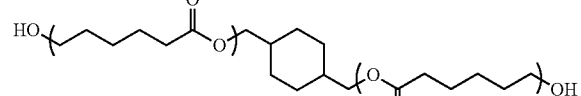
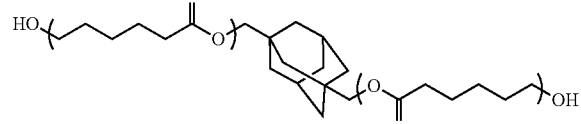
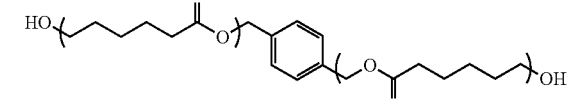
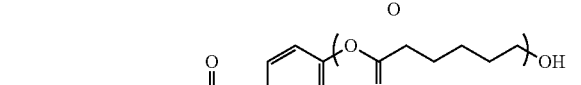
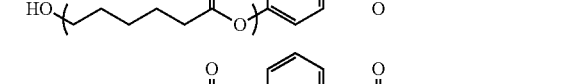
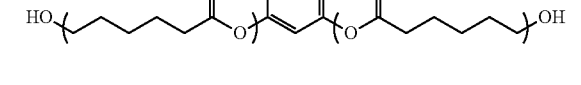

Examples of a terminal diol polyester compound for obtaining the copolymerizable polyester soft segment b4 include the following.

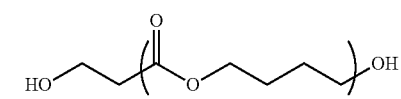
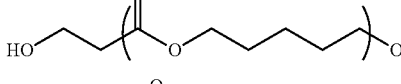
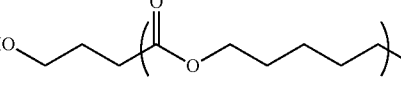
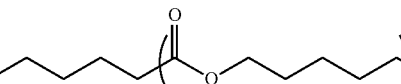
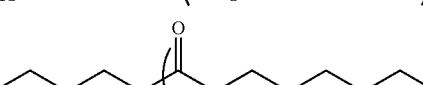

Moreover, the above-described silicone polyurethane resin can also be copolymerized with another polyester soft segment b5 besides b2 to b4. Examples of a terminal diol polyester compound for obtaining the soft segment b5 include the following.

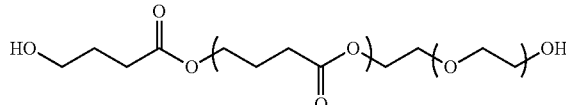
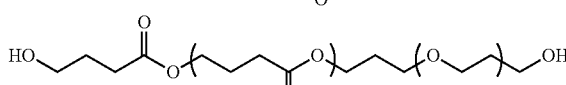
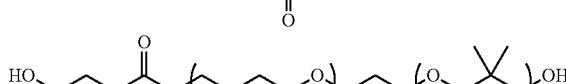
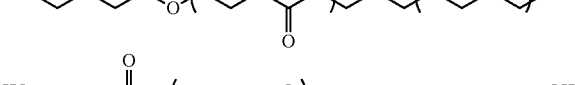
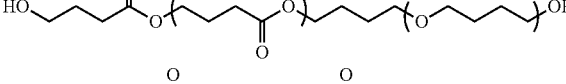
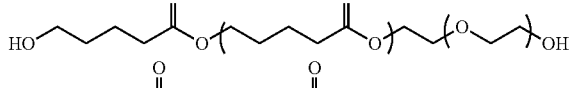
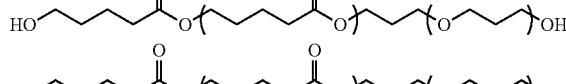
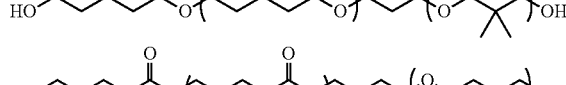
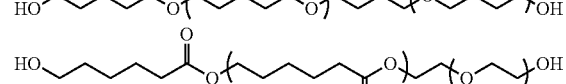
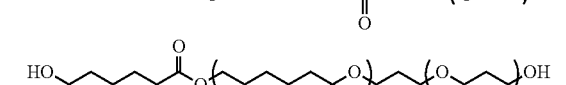
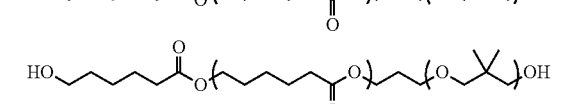

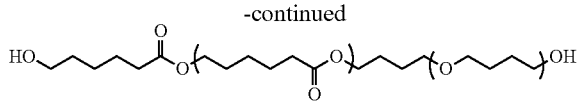

The silicone polyurethane resins each may be copolymerized with a repeating unit d for obtaining the polyether soft segments. To obtain the polyether soft segments, terminal diol polyether compounds illustrated below can also be used for the copolymerization.

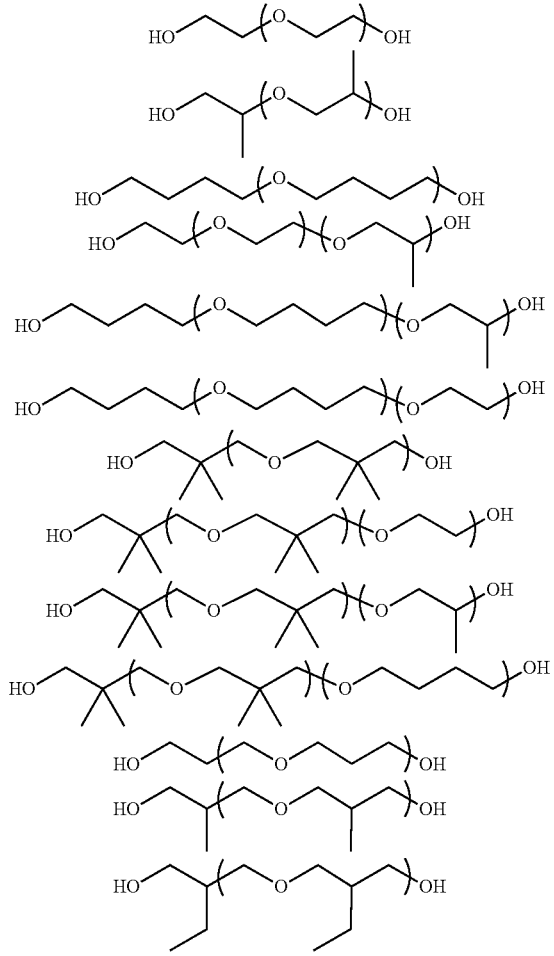

Here, the numbers of the parenthesized repeating units are 1 to 200.

The silicone pendant polyurethane resin having the structure(s) shown by a1 and/or a2 in the general formula (1) used in the inventive stretchable film can be formed by reaction between an isocyanate compound and a raw material including the diol compounds having a silicon-containing group(s) shown by the general formulae (a)-1' and (a)-2'. Further, to these, a polycarbonate compound, a polyether compound, and/or a polyester compound which have hydroxy groups at terminals may be added as a chain extender(s) for the reaction with the isocyanate compound to thereby form the silicone pendant polyurethane resin.

Specific examples of the isocyanate compound to be reacted with the diol compounds having a silicon-containing group(s) as well as the polyether compound, the polycarbonate compound, and the polyester compound which have hydroxy groups at terminals include the following.

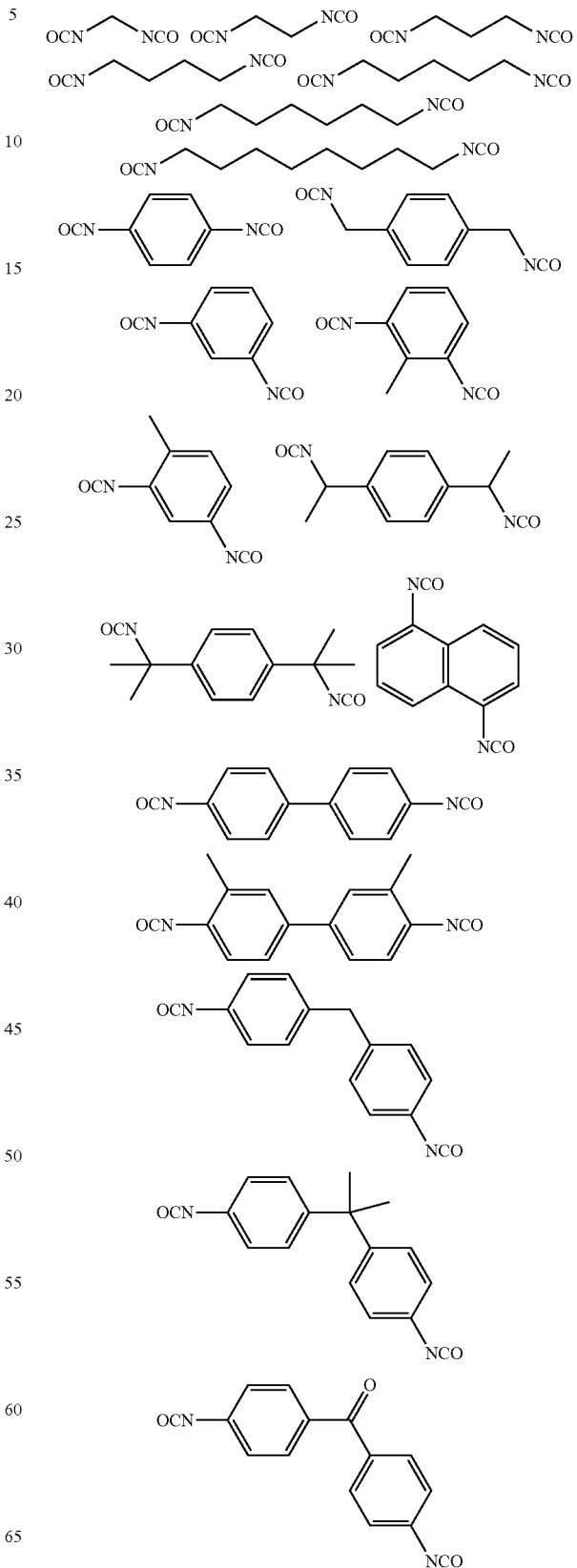

41
-continued
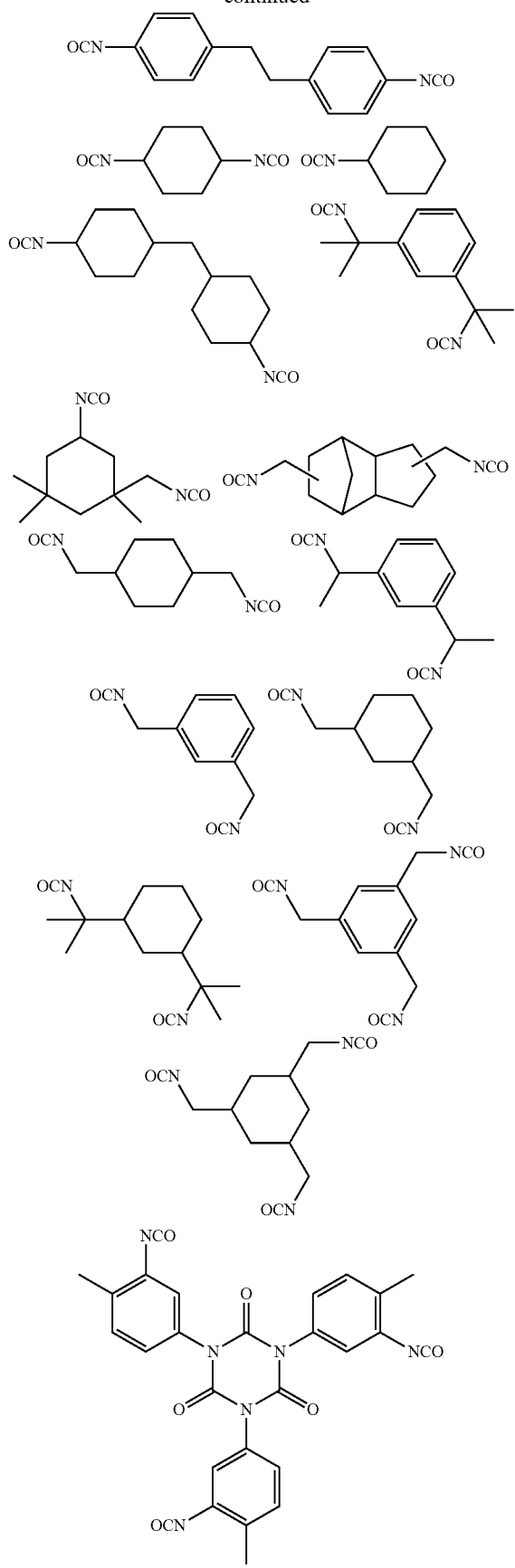
42
-continued
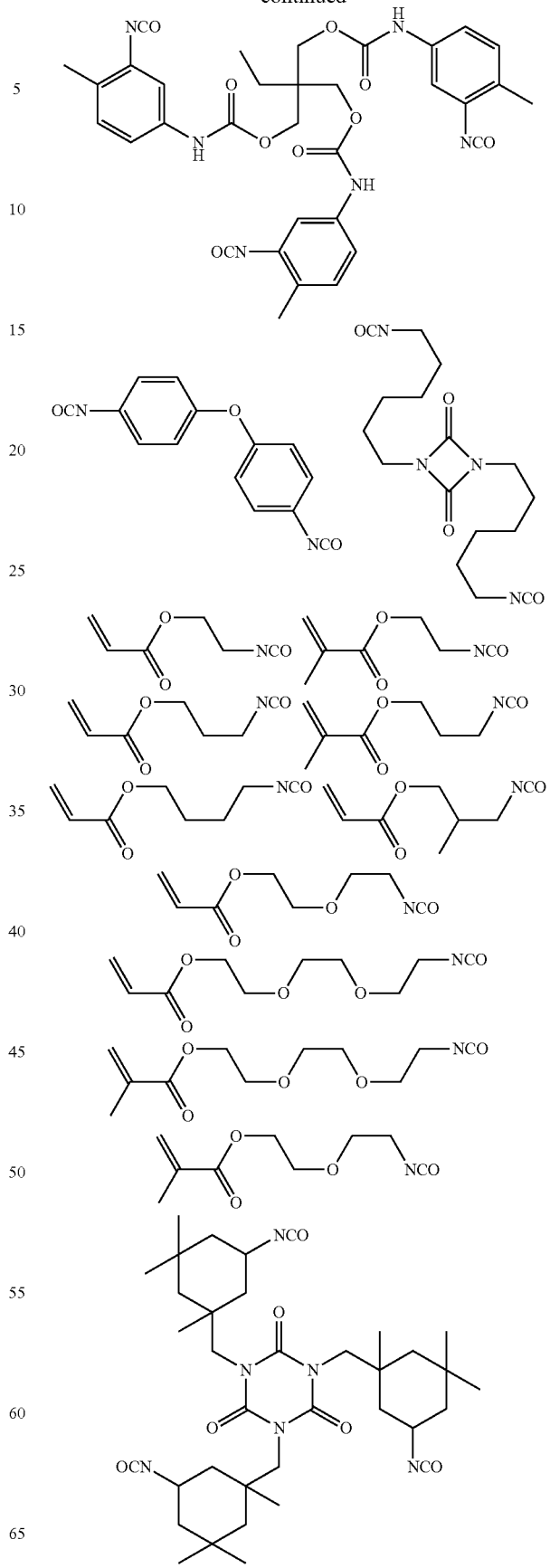

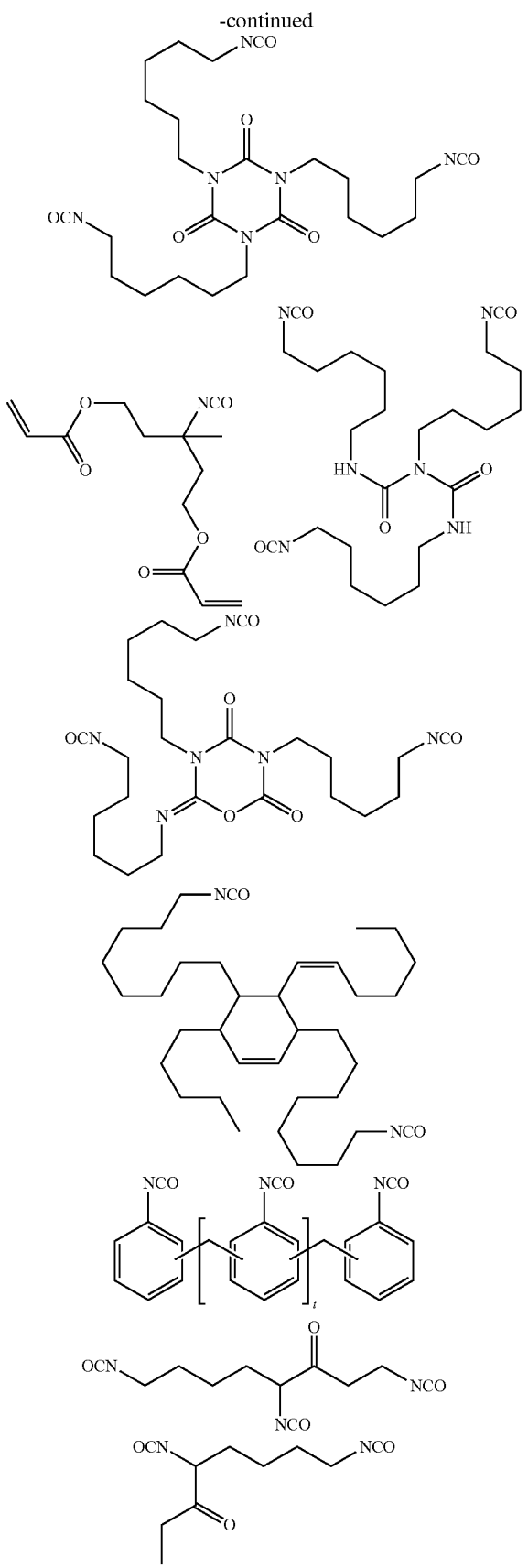

where "t" is an integer of 1 or more.

Among the above isocyanate compounds, particularly an isocyanate compound having a (meth)acrylate group can give the unit c, that is, a compound having a (meth)acrylate group at a terminal shown by the general formula (3), through the reaction with the diol compounds having a silicon-containing group(s) shown by the general formulae (a)-1', (a)-2', and/or the polyether compound, the polycarbonate compound, and the polyester compound which have hydroxy groups at terminals. Besides, the compound having a (meth)acrylate group at a terminal shown by the general formula (3) can also be obtained through a reaction between an isocyanate compound and a compound having a (meth)acrylate group with a hydroxy group.

The aforementioned isocyanate compounds have high reactivity with the diol compounds having a silicon-containing group(s) shown by the general formulae (a)-1', (a)-2' and the polyether compound, the polycarbonate compound, and the polyester compound which have hydroxy groups at terminals; hence, the reaction is sometimes difficult to control. Additionally, the isocyanate compounds react with moisture in the air to inactivate the isocyanate groups during the storage in some cases, and hence have to be carefully stored, for example, with sufficient moisture-proofing. Accordingly, in order to prevent these phenomena, a compound having a blocked isocyanate group may be used in which the isocyanate group is protected with a substituent.

The blocked isocyanate group is a blocked group that is deprotected by heating to be an isocyanate group. Specific examples thereof include isocyanate groups substituted with alcohol, phenol, thioalcohol, imine, ketimine, amine, lactam, pyrazole, oxime, β-diketone, and the like.

A catalyst may be added to decrease the temperature for deprotecting the blocked isocyanate group. Known examples of this catalyst include organic tin such as dibutyltin dilaurate, bismuth salts, and zinc carboxylate such as zinc 2-ethylhexanoate and zinc acetate.

Particularly, Japanese Patent Laid-Open Publication No. 2012-152725 shows that it is possible to decrease the temperature for deprotection reaction by including zinc carboxylate of α,β-unsaturated carboxylic acid as a blocked isocyanate dissociation catalyst.

Further, a compound having an amino group can also be added. When an isocyanate group reacts with an amino group, a urea bond is formed. The moiety of a urethane bond and a urea bond is called as a hard segment, and improves the strength through their hydrogen bonds. Thus, the strength is successfully improved by the addition of urea bonds not only by urethane bonds.

The silicone polyurethane resin used in the inventive stretchable film preferably has a weight average molecular weight of 500 or more. Such resins are favorably usable in the inventive stretchable film. The upper limit value of the weight average molecular weight of the silicone polyurethane resin is preferably 500,000, or less.

The top surface film (surface layer) of the inventive stretchable film is preferably a cured product of the stretchable film material containing the silicone side-chain type polyurethane resin having soft segments of the polycarbonate and polyester units b1 to b4 in the general formula (2). Furthermore, the top surface film (surface layer) of the inventive stretchable film may have the other polyester unit b5 and/or polyether unit d besides the units b1 to b4. In this case, the units b1 to b4 account for preferably 10% or more, more preferably 20% or more, of the composition prepared in the urethane polymerization.

Note that the inventive stretchable film preferably has a stretching property of 20 to 1000% in a tensile test stipulated according to JIS K 6251. Such a stretching property enables particularly favorable use as a substrate film for a stretchable wiring.

The inventive stretchable film having the uneven top surface is preferably used as a film to be in contact with a stretchable conductive wiring. The inventive stretchable film can be particularly favorably used for such usage.

The inventive stretchable film having the uneven top surface as described above has excellent hysteresis, stretchability and strength that are equivalent to those of polyurethane, together with a film top surface having excellent water repellency equivalent to that of silicone and being free from stickiness.

<Method for Forming Stretchable Film>

The present invention also provides a method for forming a stretchable film, including the steps of:

(1) applying a stretchable film material containing a silicone-pendant type polyurethane resin having a structure shown by the following general formula (1) onto a substrate having a repeated uneven pattern formed with depths of 0.1 μm to 2 mm and pitches of 0.1 μm to 5 mm;

(2) curing the stretchable film material by heating and/or light irradiation; and (3) peeling a cured product of the stretchable film material from the substrate,

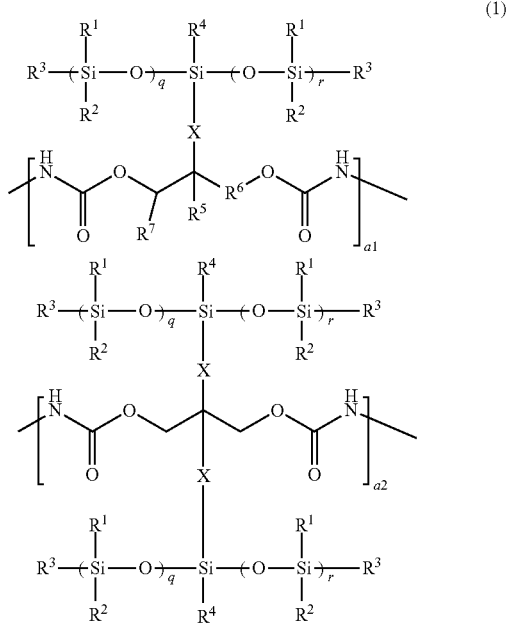

where $R^1$, $R^2$, and $R^3$ may be identical to or different from each other and each represent a linear, branched, or cyclic alkyl group having 1 to 6 carbon atoms, a phenyl group, or a 3,3,3-trifluoropropyl group; $R^4$'s may be identical to or different from each other and each represent a linear, branched, or cyclic alkyl group having 1 to 6 carbon atoms, a phenyl group, a 3,3,3-trifluoropropyl group, or a $-(OSiR^1R^2)_s-OSiR^1R^2R^3$ group; $R^5$ represents a hydrogen atom or a linear or branched alkyl group having 1 to 4 carbon atoms; $R^6$ represents a single bond, a methylene group, or an ethylene group; $R^7$ represents a hydrogen atom or a methyl group; X represents a linear or branched alkylene group having 3 to 7 carbon atoms and optionally containing an ether group; "q", "r", and "s" each represent an integer in a range of 0 to 20; and a1 and a2 represent proportions of repeating units and satisfy ranges of $0 \leq a1 < 1.0$, $0 \leq a2 < 1.0$, and $0 < a1+a2 \leq 1.0$.

In this event, the inventive method may include, between the step (1) and the step (2), (1') a step of pressure-bonding a polyurethane film onto the stretchable film material.

Alternatively, the inventive method may include, between the step (2) and the step (3), (2'-1) a step of coating the cured product of the stretchable film material with a stretchable film material containing a polyurethane resin, and (2'-2) a step of curing the stretchable film material containing the polyurethane resin by heating and/or light irradiation to form a polyurethane film.

In this respect, FIG. 3 shows an example of the process of forming the inventive stretchable film having a repeated uneven pattern on the top surface. A substrate 7' is prepared to have a cross section as shown in FIG. 3(a) in which a repeated pattern is formed. Onto the substrate 7' having the repeated pattern, a stretchable film material 8 containing a silicone-pendant type polyurethane resin having a structure shown by the general formula (1) is applied as shown in FIG. 3(b) and cured by heating and/or light irradiation. A cured product of the stretchable film material 8 is peeled from the substrate 7'. Thus, as shown in FIG. 3(c), a stretchable film 6 having the repeated uneven pattern formed on the top surface can be obtained.

Next, FIG. 4 shows another example of the inventive method for forming a stretchable film. A substrate 7' having a repeated pattern as shown in FIG. 4(a) is prepared. Next, as shown in FIG. 4(b), a stretchable film material 8 containing a silicone pendant polyurethane resin shown by the general formula (1) is applied onto the substrate 7', and a polyurethane film 9 is disposed on the stretchable film material 8. The stretchable film material 8 is cured by heating and/or light irradiation, so that a cured product 11 can be obtained. Then, as shown in FIG. 4(c), this cured product 11 is peeled, so that a stretchable film 6 having the repeated uneven pattern formed on the top surface can be obtained.

The polyurethane film 9 to be disposed on the top does not necessarily have to contain silicon, but preferably contains silicon from the viewpoint of high water repellency. The polyurethane film to be disposed on the top may be a commercially-available thermoplastic polyurethane (TPU) film. Moreover, since the polyurethane to be disposed on the top requires high stretchability, the polyurethane preferably contains a polyether or polyester soft segment.

Next, FIG. 5 shows still another example of the inventive method for forming a stretchable film. A substrate 7' having a repeated pattern as shown in FIG. 5(a) is prepared. Next, as shown in FIG. 5(b), a stretchable film material 8 containing a silicone pendant polyurethane resin shown by the general formula (1) is applied and cured. Further, as shown in FIG. 5(c), a polyurethane material 10 (a stretchable film material containing a polyurethane resin) may be applied and cured. Then, as shown in FIG. 5 (d), the film is peeled, so that a stretchable film 6 having the repeated uneven pattern formed on the top surface can be obtained.

The polyurethane material 10 to be applied on the top does not necessarily have to contain silicon, but preferably contains silicon from the viewpoint of high water repellency. Moreover, since the polyurethane to be applied on the top requires high stretchability, the polyurethane resin preferably contains a polyether or polyester soft segment.

Next, FIG. 6 shows still another example of the inventive method for forming a stretchable film. On a stretchable substrate 13 shown in FIG. 6(a), an uneven pattern made of a stretchable film material 8 is directly formed by ejection through inkjet printing or the like as shown in FIG. 6(b) and then cured by light irradiation, so that the uneven pattern made of a cured product 11 of the stretchable film material is formed as shown in FIG. 6(c). This method does not necessarily require a printing plate and thus can improve the throughput. Since the ejected ink flows to flatten the unevenness, it is necessary to cure the ink immediately after the ejection. The curing is performed preferably by light irradiation which is capable of instant curing, or preferably with an LED laser capable of pinpoint curing in synchronism with the movement of the ink jet nozzle.

According to the inventive method for forming a stretchable film, on a printing plate with a repeated uneven pattern, a stretchable film material containing a silicone pendant polyurethane resin shown by the general formula (1) may be applied, cured, and peeled to form a stretchable film. The printing plate with a repeated uneven pattern (a substrate having a repeated uneven pattern formed thereon) to be used is preferably made of glass, quartz, metal, Teflon (registered trademark), polyethylene, or polypropylene.

Particularly, when the substrate having a repeated pattern formed thereon is made of quartz, the stretchable film material can be cured by light irradiation through the quartz surface. This curing method is the same as flash nanoimprinting lithography. To improve the release characteristics, the printing plate may be coated with a release agent, or a printing plate surface-treated with an alkoxysilane compound having a fluoroalkyl group may be used. As the release agent, a fluorine-based surfactant or a silicone-based surfactant is preferably used.

The pattern depth ranges from 0.1 μm to 2 mm, and the pattern pitch ranges from 0.1 μm to 5 mm. The pattern may have a wavy cross section as shown in FIG. 3(a), or the cross section may have triangular, trapezoidal, concave lens-like, convex lens-like, or quadrangular shapes. A wavy shape (a corrugated shape) is preferable from the viewpoints of filling and release characteristics of the silicone pendant polyurethane.

When the uneven pattern is observed from the above, the layout may be, for example: a row of lines such as vertical, horizontal, oblique, wavy, or radial lines, or combinations thereof; combinations of these lines that intersect with each other in a lattice form or similar other forms; and holes or protrusions arranged in a circular, elliptical, triangular, quadrangular, pentagonal, or hexagonal shape.

Examples of the method for applying the stretchable film material onto the substrate having the repeated pattern include spin coating, bar coating, roll coating, flow coating, dip coating, spray coating, doctor coating, screen printing, inkjet printing, and the like.

The uneven pattern can be formed on a stretchable substrate with a 3D printer by inkjet printing or nozzle ejection. Light irradiation immediately after the ejection from the nozzle onto the stretchable substrate enables the formation of the uneven pattern without deformation. In this case, since a printing plate is not required, the productivity is high. For the light irradiation, it is possible to use not only a UV lamp but also an LED. Pinpoint UV irradiation with an LED laser is preferable because desired shapes can be formed at will in combination with inkjet printing.

Note that the viscosity of the stretchable film material (mixture solution) can be controlled as appropriate. To decrease the viscosity, for example, an organic solvent is mixed; to increase the viscosity, for example, a filler such as silica is mixed.

The organic solvent is preferably an organic solvent having a boiling point in a range of 115 to 200° C. at atmospheric pressure. Specifically, it is preferable to use one or more selected from 2-octanone, 2-nonanone, 2-heptanone, 3-heptanone, 4-heptanone, 2-hexanone, 3-hexanone, diisobutyl ketone, methylcyclohexanone, acetophenone, methylacetophenone, propyl acetate, butyl acetate, isobutyl acetate, amyl acetate, butenyl acetate, isoamyl acetate, phenyl acetate, propyl formate, butyl formate, isobutyl formate, amyl formate, isoamyl formate, methyl valerate, methyl pentenoate, methyl crotonate, ethyl crotonate, propylene glycol monomethyl ether, ethylene glycol monomethyl ether, propylene glycol monoethyl ether, ethylene glycol monoethyl ether, propylene glycol dimethyl ether, diethylene glycol dimethyl ether, propylene glycol monomethyl ether acetate, and propylene glycol monoethyl ether acetate.

Embodiment 1

As a method for forming a layer having a repeated uneven pattern as described above, for example, a network of a polycarbonate- or polyester-containing silicone pendant polyurethane is formed on a printing plate with a repeated uneven pattern, concurrently cured by heating or light irradiation, and peeled from the printing plate.

In this event, it is preferable to form an uneven stretchable film by: mixing the polycarbonate compound or the polyester compounds for forming the units b1 to b4 in the general formula (2), the silicone pendant diol compound for forming the unit a1 or the unit a2, a compound having an isocyanate group, optionally a polyether diol compound or a polyester diol compound for chain extension, an amine compound, a compound having three or more hydroxy groups as a cross-linking agent, and a catalyst; forming a film of this stretchable film material mixture on the printing plate with a repeated uneven pattern; and curing the film by heating.

In this method, a polymer network is formed by forming urethane bonds through the reaction of the isocyanate groups and the hydroxy groups, and increasing the molecular weight simultaneously. When compounds having three or more hydroxy groups or isocyanate groups are added, cross-link reaction proceeds, thereby lowering the stretchability but improving the film strength. Accordingly, it is possible to control the hardness, stretchability, and strength by controlling the loading amount of the compounds having two or three hydroxy groups or isocyanate groups. Additionally, an independent stretchable film can be obtained by peeling the film from the substrate after the curing.

Regarding the molar ratio of the hydroxy groups and the isocyanate groups in the stretchable film material (mixture), it is preferable that the hydroxy groups and the isocyanate groups be in the same molar number, or that the molar number of the hydroxy group be larger, that is, the value obtained by dividing the molar number of the hydroxy groups by the molar number of the isocyanate groups be 1 or more. When the molar number of the isocyanate groups is smaller, carbon dioxide cannot be formed through the reaction of excess isocyanate groups with water, thereby preventing voids due to foaming in the film. When foamed urethane is prepared, excess isocyanate groups are present therein. Since the inventive stretchable film requires the property of higher strength, the film is preferably free from void due to foaming.

When a cured product of the stretchable film material is formed in such a state that the molar number of the hydroxy groups is larger than that of the isocyanate groups as described above, the terminal of the polymer sometimes has a urethane bond that is formed only at one side of each diol compound shown by general formulae (a')-1, (a')-2:

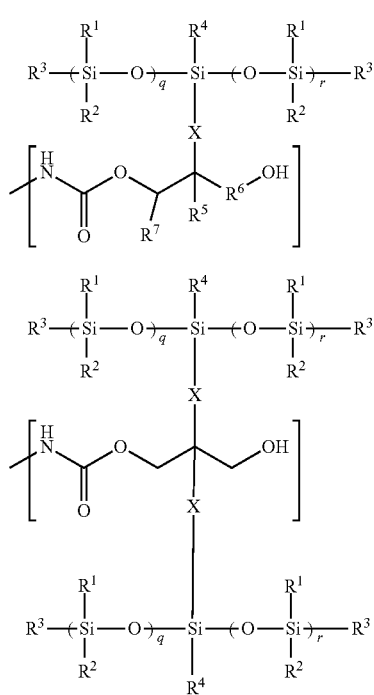

where $R^1$ to $R^7$, X, "q", and "r" are as defined above.

Other than the above-described method, the film can also be formed by a prepolymer method in which a hydroxy group-containing compound and an isocyanate compound are mixed to form a polymer material (prepolymer); then, a hydroxy group-containing compound or an isocyanate group-containing compound is additionally mixed and cured by heating. When the prepolymer is formed, one of the hydroxy group-containing compound and the isocyanate compound is used in an excess amount to increase the molecular weight. This can decrease the amount of unreacted residual isocyanate to decrease the uncrosslinked portion to thus form a film with higher strength compared to the case of one shot method, in which the hydroxy group-containing compound and the isocyanate compound are mixed to form a film at once.

The heating temperature in curing is preferably in a range of room temperature to 200° C., more preferably in a range of 40 to 160° C., for a period of 5 seconds to 60 minutes.

Embodiment 2

Alternatively, the stretchable film having an uneven top surface can also be formed by: synthesizing a urethane polymer through reaction of isocyanate and hydroxy groups; forming a (meth)acrylate group at a terminal of the urethane polymer as shown in the general formula (3); forming a film of this polymer; and curing the film by heating and/or light irradiation.

Specifically, in the case of polycarbonate-containing silicone pendant polyurethane acrylate, the polycarbonate diol compound for obtaining the unit b1 in the general formula (2) and the silicone pendant diol compound for obtaining the unit a1 or a2 are mixed with a protected or unprotected isocyanate compound, and an isocyanate group-containing (meth)acrylate compound or hydroxy group-containing (meth)acrylate. After the polymerization, a polycarbonate-containing silicone pendant urethane (meth)acrylate polymer is synthesized which has (meth)acrylate at the polymer terminal.

The polycarbonate-containing silicone pendant urethane (meth)acrylate polymer is crosslinked by radical. As a method for radical crosslinking, a radical generator is desirably added. Examples of the radical generator include a thermal-radical generator which generates a radical by thermal decomposition, and a photo-radical generator which generates a radical by light irradiation.

Examples of the thermal-radical generator include azo radical generators and peroxide radical generators. Examples of the azo radical generators include 2,2'-azobisisobutyronitrile (AIBN), 2,2'-azobis(2,4-dimethylvaleronitrile), dimethyl 2,2'-azobis(2-methylpropionate), 2,2'-azobis(4-methoxy-2,4-dimethylvaleronitrile), 2,2'-azobis(cyclohexane-1-carbonitrile), 4,4'-azobis(4-cyanovaleric acid), and the like. Examples of the peroxide radical generators include benzoyl peroxide, decanoyl peroxide, lauroyl peroxide, succinyl peroxide, t-butylperoxy-2-ethylhexanoate, t-butylperoxypivaloate, 1,1,3,3-tetramethylbutylperoxy-2-ethylhexanoate, and the like.

Examples of the photo radical generator include acetophenone, 4,4'-dimethoxybenzyl, benzyl, benzoin, benzophenone, 2-benzoylbenzoic acid, 4,4'-bis(dimethylamino)benzophenone, 4,4'-bis(diethylamino)benzophenone, benzoin methyl ether, benzoin ethyl ether, benzoin isopropyl ether, benzoin butyl ether, benzoin isobutyl ether, 4-benzoylbenzoic acid, 2,2'-bis(2-chlorophenyl)-4,4',5,5'-tetraphenyl-1,2'-biimidazole, methyl 2-benzoylbenzoate, 2-(1,3-benzodioxole-5-yl)-4,6-bis(trichloromethyl)-1,3,5-triazine, 2-benzyl-2-(dimethylamino)-4'-morpholinobutyrophenone, 4,4'-dichlorobenzophenone, 2,2-diethoxyacetophenone, 2,2-dimethoxy-2-phenylacetophenone, 2,4-diethylthioxanthen-9-one, diphenyl(2,4,6-trimethylbenzoyl)phosphine oxide, 1,4-dibenzoylbenzene, 2-ethylanthraquinone, 1-hydroxycyclohexyl phenyl ketone, 2-hydroxy-2-methylpropiophenone, 2-hydroxy-4'-(2-hydroxyethoxy)-2-methylpropiophenone, 2-isonitrosopropiophenone, 2-phenyl-2-(p-toluenesulfonyloxy)acetophenone (BAPO), and camphorquinone.

Note that the loading amount of the thermal or photo-radical generator is preferably in a range of 0.1 to 50 parts by mass based on 100 parts by mass of the resin in the stretchable film material.

It is also possible to add a crosslinking agent that has a plurality of (meth)acrylate or thiol. This makes it possible to improve the efficiency of radical crosslinking.

The stretchable film material may be mixed with a monomer that has an alkyl group or an aryl group, or a monomer that has an alkyl group or an aryl group substituted with a silicon-containing group or fluorine. These make it possible to form a thinner stretchable film by decreasing the viscosity of the solution. When each monomer has a polymerizable double bond, the monomer can be fixed into the film in curing the film.

Examples of the monomer that has an alkyl group or an aryl group include isobornyl acrylate, lauryl acrylate, tetradecyl acrylate, stearyl acrylate, isostearyl acrylate, behenyl acrylate, adamantane acrylate, phenoxyethylene glycol acrylate, phenoxydiethylene glycol acrylate, and 2 to 6 functional acrylates. Examples of the bifunctional acrylate include 1,6-hexanediol diacrylate, 1,9-nonanediol diacrylate, isononanediol diacrylate, 1,10-decanediol diacrylate, neopentyl glycol diacrylate, 2-hydroxy-3-methacrylpropyl acrylate, diethylene glycol diacrylate, triethylene glycol diacrylate, polyethylene glycol diacrylate, dipropylene glycol diacrylate, tripropylene glycol diacrylate, polypropylene glycol diacrylate, polytetramethylene glycol diacrylate, polyethylene polypropylene glycol diacrylate, dioxane glycol diacrylate, tricyclodecanedimethanol diacrylate, 9,9-bis[4-(2-hydroxyethoxy)phenyl]fluorene diacrylate, ethoxylated bisphenol A diacrylate, propoxylated bisphenol A diacrylate, and ethoxylated propoxylated bisphenol A diacrylate. Examples of the trifunctional acrylate include trimethylolpropane triacrylate, ethoxylated trimethylolpropane triacrylate, propoxylated trimethylolpropane triacrylate, glycerin triacrylate, ethoxylated glycerin triacrylate, propoxylated glycerin triacrylate, tris(2-acryloxyethyl)isocyanurate, caprolactone modified tris(2-acryloxyethyl)isocyanurate, and pentaerythritol triacrylate. Examples of the tetrafunctional acrylate include pentaerythritol tetraacrylate, ethoxylated pentaerythritol tetraacrylate, propoxylated pentaerythritol tetraacrylate, ditrimethylolpropane tetraacrylate, ethoxylated ditrimethylolpropane tetraacrylate, and propoxylated ditrimethylolpropane tetraacrylate. Examples of the penta- or hexa-functional acrylate include dipentaerythritol polyacrylate, ethoxylated dipentaerythritol polyacrylate, and propoxylated dipentaerythritol polyacrylate. It is also possible to use these monomers in which each acrylate is replaced by methacrylate.

When the stretchable film is formed using the compound having a (meth)acrylate group at a terminal, the curing can be performed by combining heat-curing and photo-curing. For example, it is possible to form a stretchable film, which serves as base, by heat-curing, and then form a stretchable film having an uneven pattern on the base by photo-curing. The merits of photo-curing are that heating is not necessarily essential, and the curing can be performed in a short period. The demerit is that the area where light does not reach cannot be cured. By combining heat-curing and photo-curing, a curing method that takes advantage of each curing merit can be selected.

When the compound having a (meth)acrylate group at a terminal is cured by heating, the heat-curing can be performed, for example, with a hot plate, in an oven, or by irradiation of far infrared ray. The heating conditions are preferably at 30 to 150° C. for 10 seconds to 60 minutes, more preferably at 50 to 120° C. for 30 seconds to 20 minutes. The baking environment may be in the atmosphere, in an inert gas, or in vacuum.

When the compound having a (meth)acrylate group at a terminal is cured by light irradiation, the curing by light irradiation is preferably performed with light having a wavelength of 200 to 500 nm. As the light source, for example, a halogen lamp, a xenon lamp, excimer laser, a metal halide lamp, LED, or the like can be used. Alternatively, electron beam irradiation may be adopted. The irradiation quantity is preferably in a range of 1 mJ/cm$^2$ to 100 J/cm$^2$.

The invention stretchable film having a repeated uneven pattern on the top surface can be used not only as a self-standing film alone, but can also be formed on fiber or a membrane film.

<Use Examples of the Inventive Stretchable Film>

Here, FIGS. 2 and 7 to 12 show examples of using the inventive stretchable film. FIG. 2 is a schematic illustration of an electrocardiograph 1 formed on the inventive stretchable film 6, which is viewed from a bio-electrode side. As shown in FIG. 2, in the electrocardiograph 1, three bio-electrodes 2 are linked with each other by a wiring 3, which conducts electric signals, and are connected to a center device 4; and adhesive parts 5 are disposed around the bio-electrodes 2. The electrocardiograph 1 is described in Patent Document 1. Moreover, FIG. 7 is a cross-sectional view showing a state where the inventive stretchable film 6 having an uneven pattern portion 6-1 is provided on the substrate 7. FIG. 8 is a cross-sectional view showing a state where the electrocardiograph 1 is formed on the stretchable film 6. FIG. 9 is a cross-sectional view showing a state where the stretchable wiring 3 and the center device 4 of the electrocardiograph 1 are covered with the stretchable film 6.

As the material of the wiring 3, electrically conductive materials are generally used, including carbon and metals such as gold, silver, platinum, titanium, and stainless steel. Note that, to provide stretchability, the wiring 3 can be a meandering-shaped wiring as described in Patent Document 1, and can be formed by pasting a powder of the electrically conductive material or a wire of the electrically conductive material on a stretchable film, printing electrically conductive ink containing the electrically conductive material on a stretchable film, or using an electrically conductive fabric in which the electrically conductive material and fibers are combined.

Since the electrocardiograph 1 has to be attached to skin, the adhesive part 5 is disposed around each of the bio-electrodes 2 in FIGS. 8, 9 in order not to separate the bio-electrode 2 from the skin. Incidentally, when the bio-electrode 2 has adhesiveness, the surrounding adhesive part 5 is not necessarily essential.

This electrocardiograph 1 is formed on the stretchable film 6, which is the inventive stretchable film having an uneven top surface, as shown in FIG. 2. Since the stretchable film 6 has little stickiness on its top surface, when printing is performed thereon by screen printing and so on, the stretchable film 6 shows favorable printing plate-release. If the printing plate-release is unfavorable, the ink is released together when the printing plate is released. This is not preferable because the ink may not be transferred on the stretchable film properly.

Further, the stretchable wiring 3 can be covered with the stretchable film 6. In this case, the stretchable film 6 does not necessarily have to have the uneven top surface.

Furthermore, it is also possible to form a stretchable film as shown in FIG. 10 by inverting the stretchable film shown in FIG. 7, and forming an uneven film on the other surface, so that uneven patterns are formed on both sides (top surface and bottom surface) of the stretchable film. Cross-sectional views of an electrocardiograph using this stretchable film are shown in FIG. 11 and FIG. 12.

The inventive method for forming a stretchable film having a repeated uneven pattern on the top surface as described above makes it possible to easily form a stretchable film that has excellent stretchability and strength equivalent or superior to those of polyurethane, with the film top surface having high water repellency and low tackiness.

Example

Hereinafter, the present invention will be specifically described with reference to Examples and Comparative Examples. However, the present invention is not limited thereto. Incidentally, the weight average molecular weight (Mw) represents a weight average molecular weight in terms of polystyrene determined by gel permeation chromatography (GPC).

Silicone pendant urethane (meth)acrylates 1 to 13 and Urethane (meth)acrylates 1 to 3, which were blended as the compound having a (meth)acrylate group at a terminal to Stretchable film materials 1 to 18 shown in Table 1, are shown below.

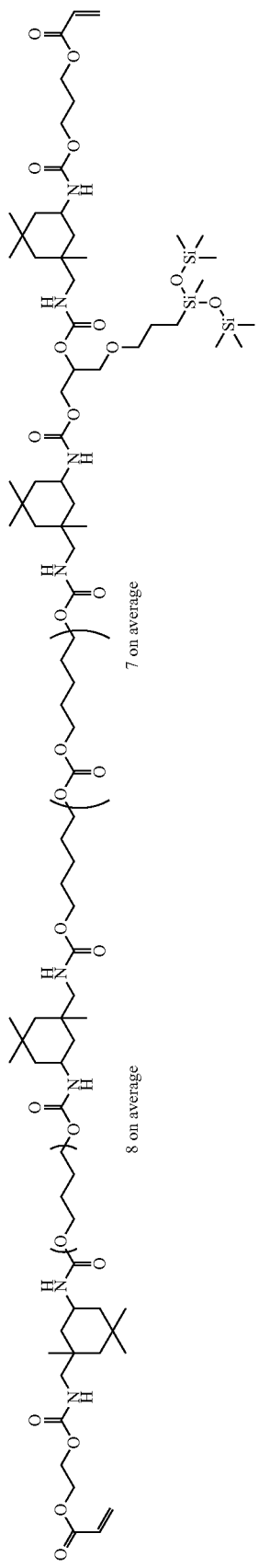
Silicone pendant urethane (meth) acrylate 1
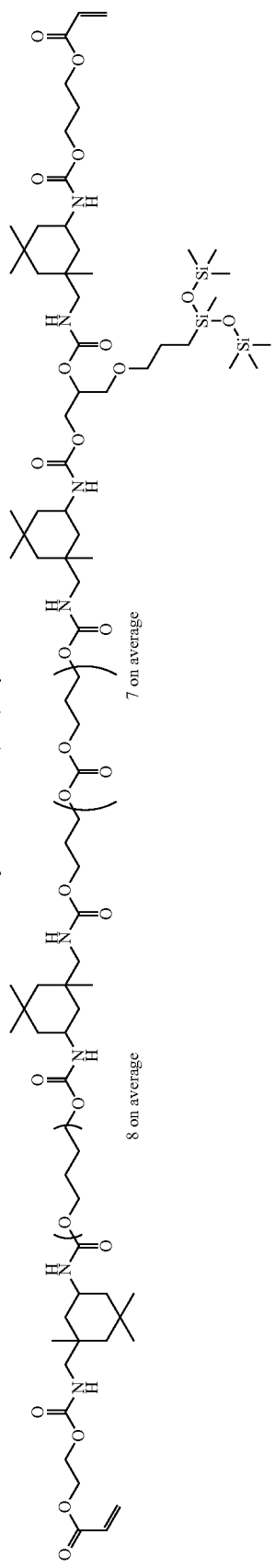
Silicone pendant urethane (meth) acrylate 2
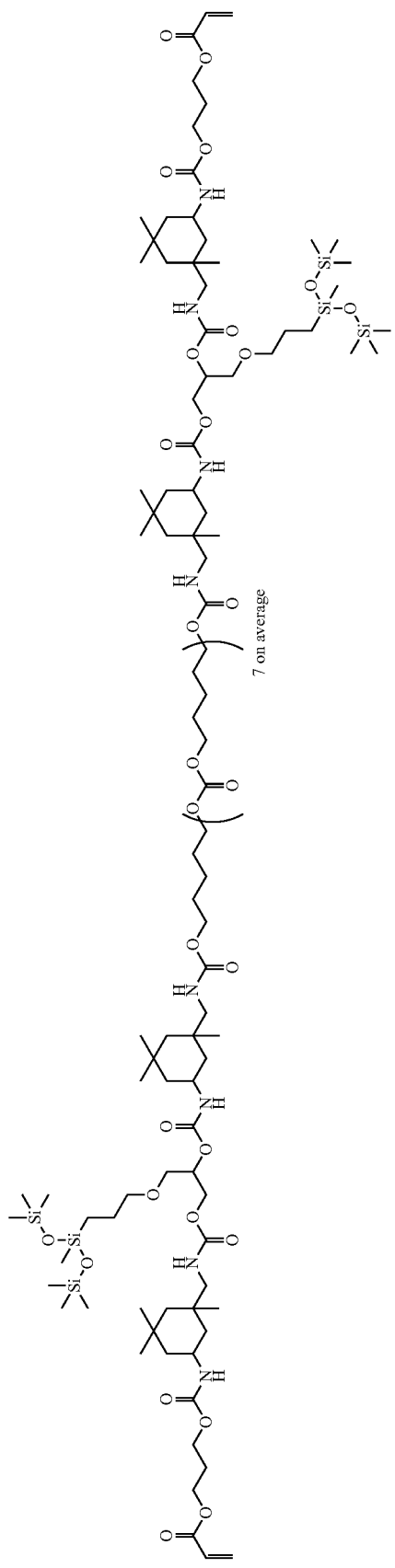
Silicone pendant urethane (meth) acrylate 3

-continued
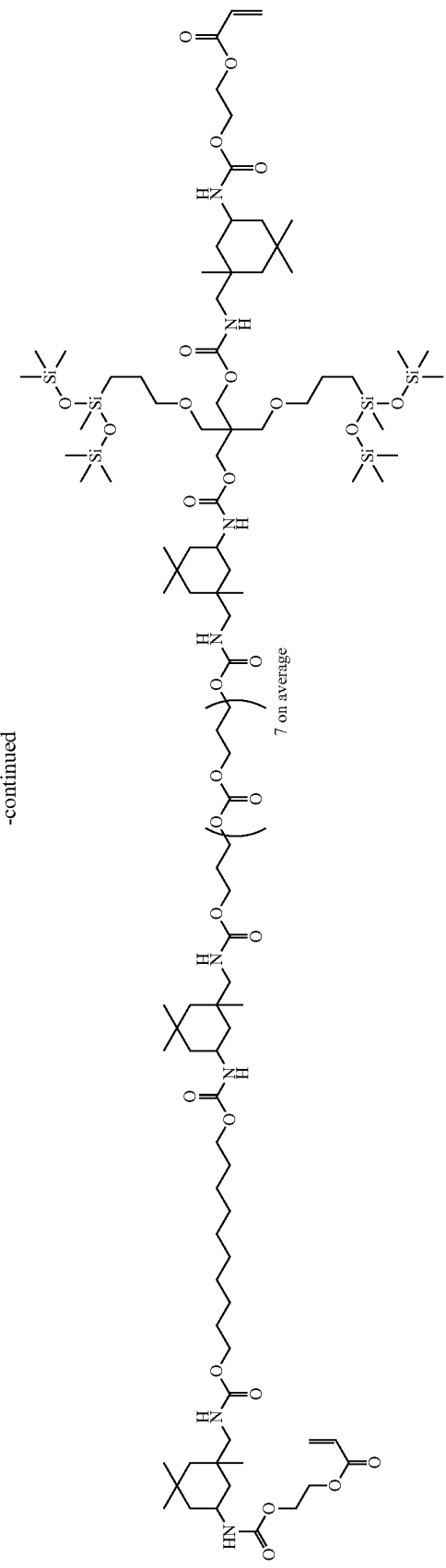
Silicone pendant urethane (meth) acrylate 4
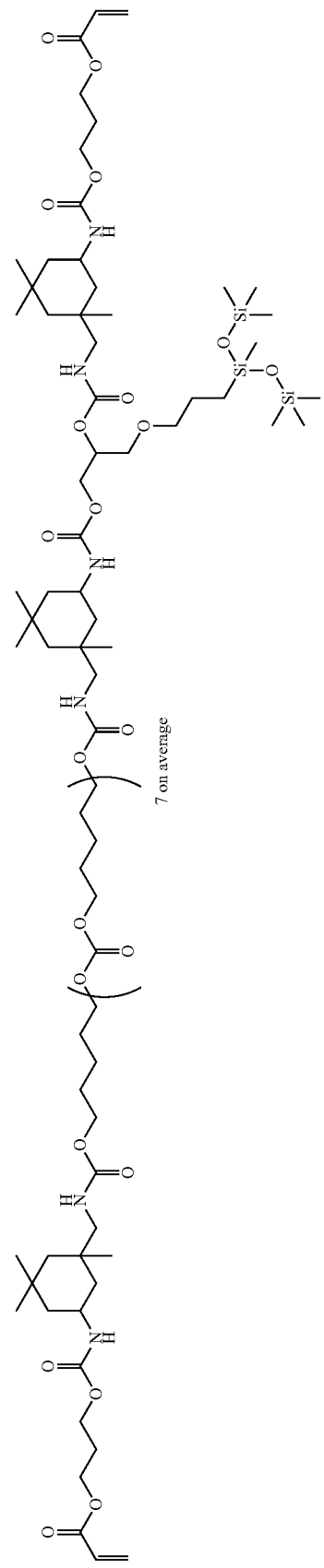
Silicone pendant urethane (meth) acrylate 5

-continued
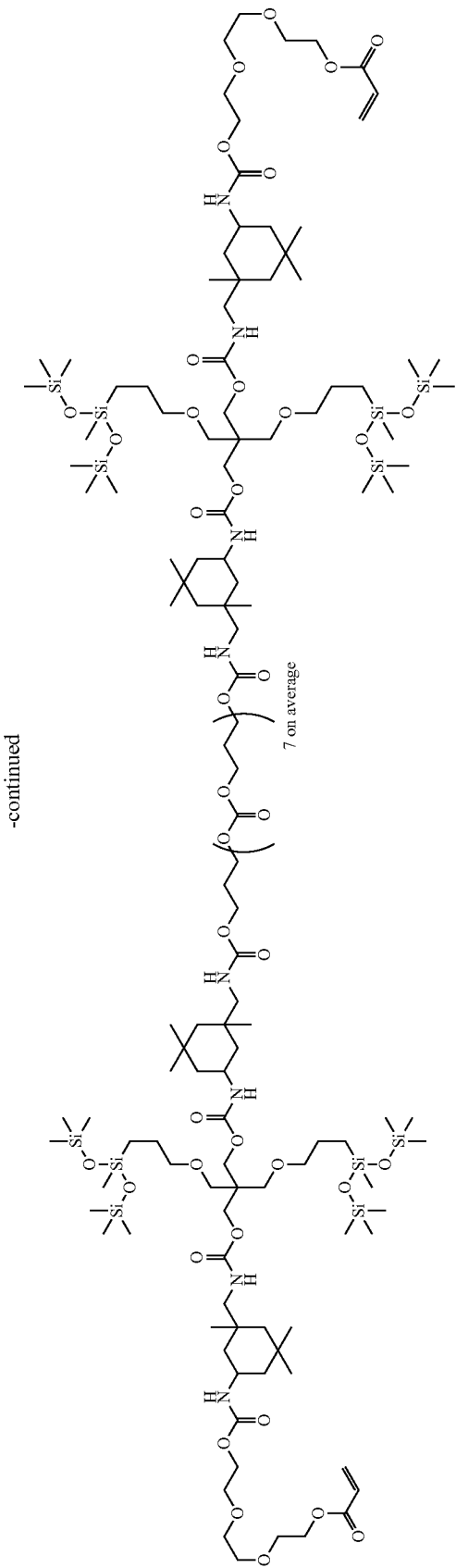
Silicone pendant urethane (meth) acrylate 6
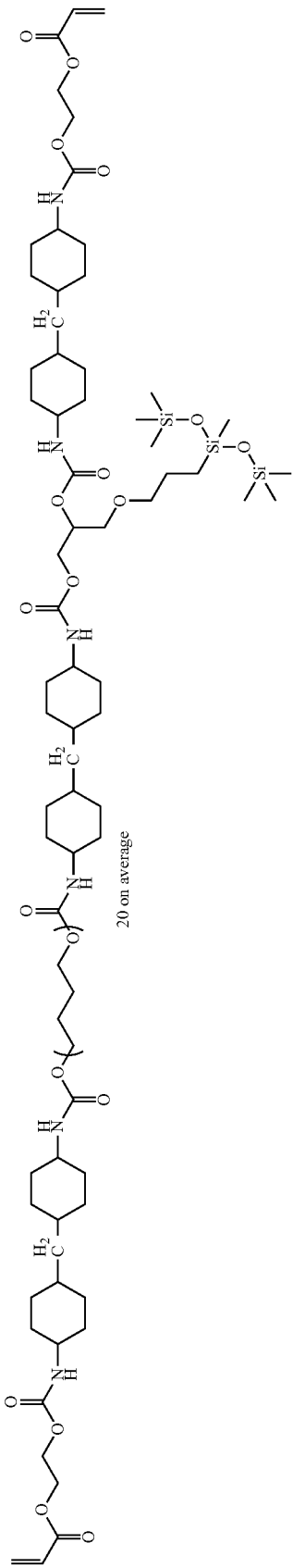
Silicone pendant urethane (meth)acrylate 7

-continued
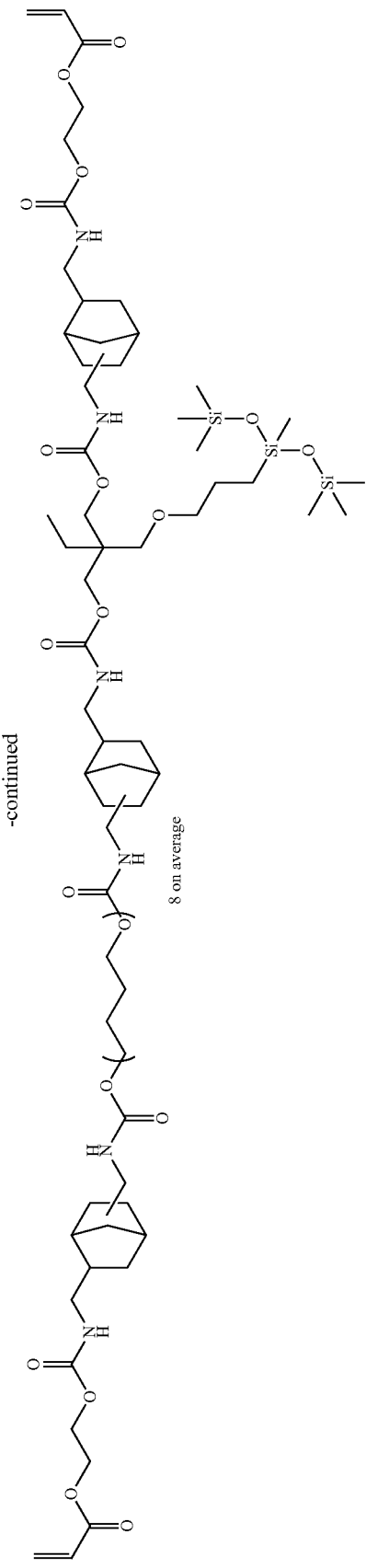
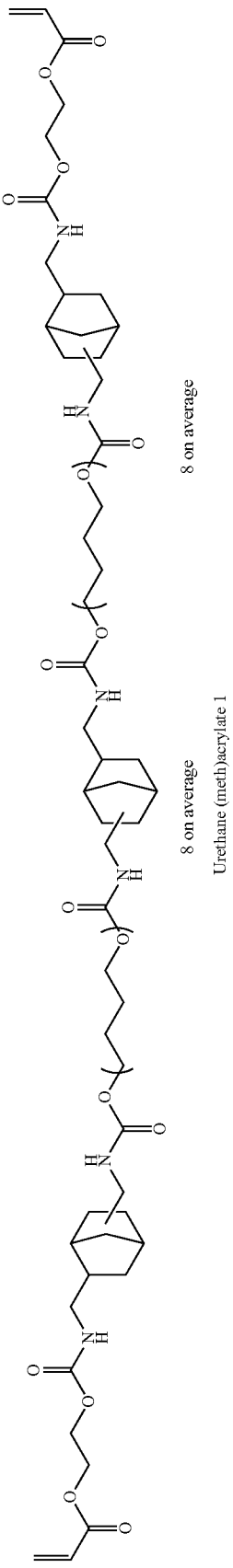
Silicone pendant urethane (meth)acrylate 8
Urethane (meth)acrylate 1
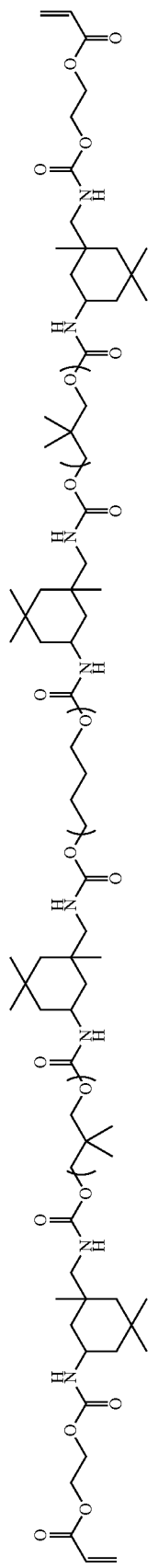
Urethane (meth)acrylate 2
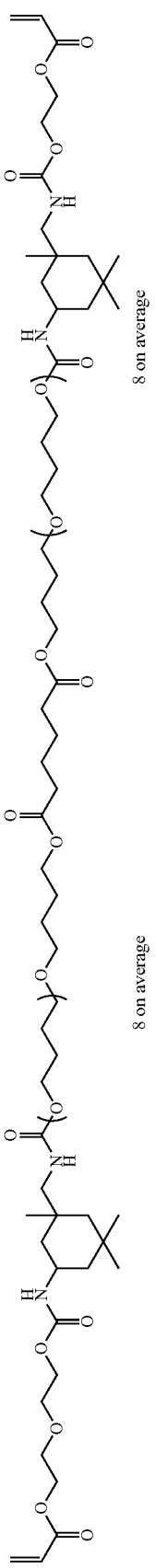
Urethane (meth)acrylate 3

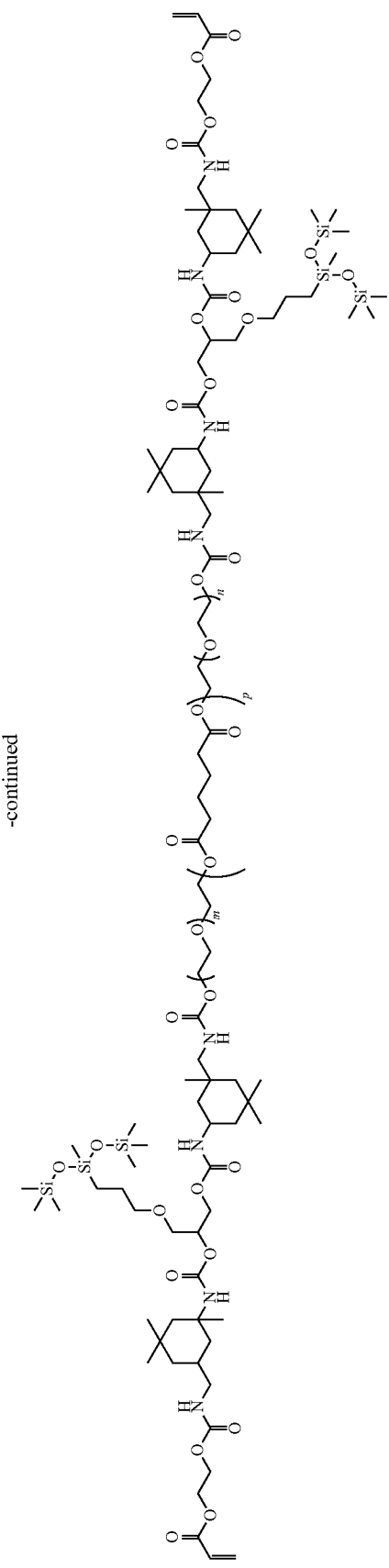
m + n = 20
p = 10
on average
Silicone pendant urethane (meth) acrylate 9
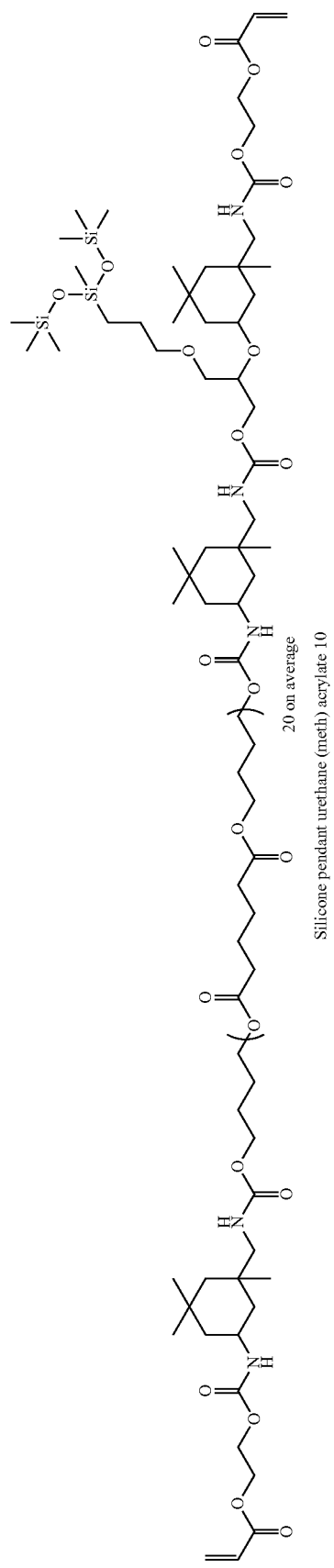
20 on average
Silicone pendant urethane (meth) acrylate 10

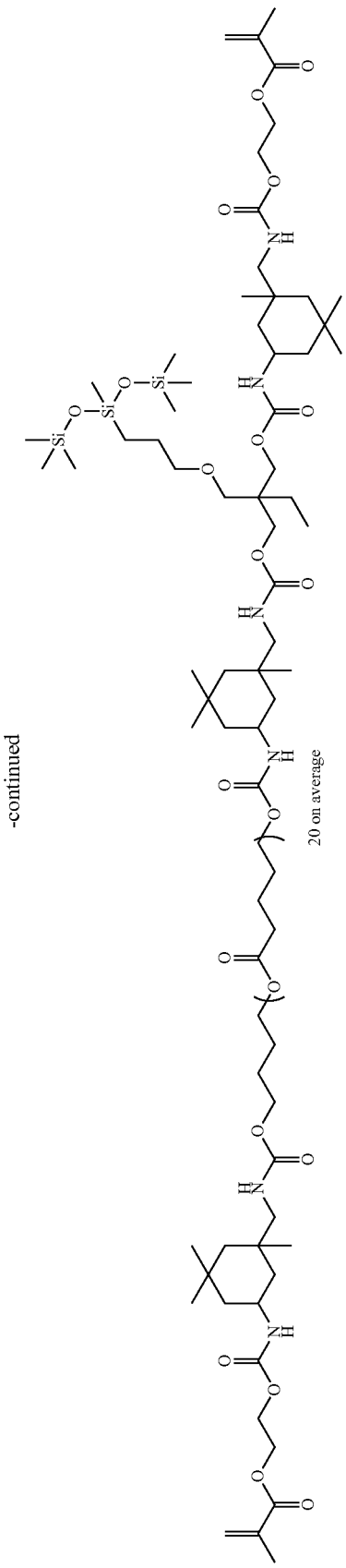
Silicone pendant urethane (meth) acrylate 11
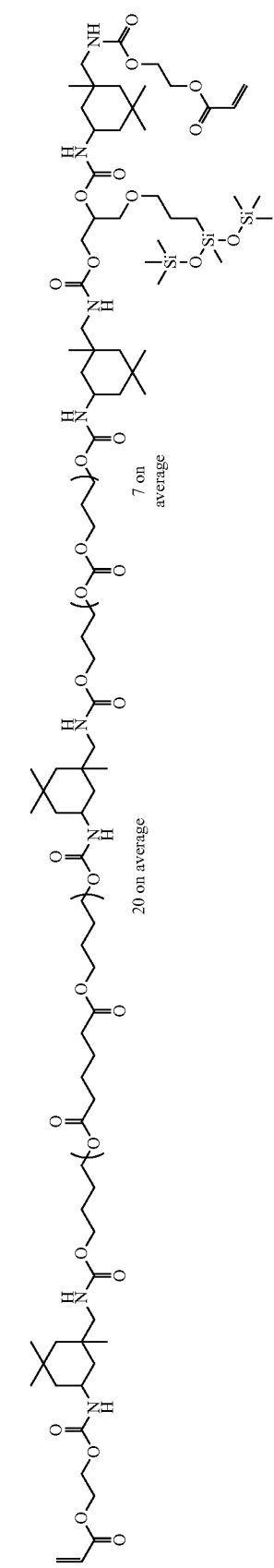
Silicone pendant urethane (meth) acrylate 12
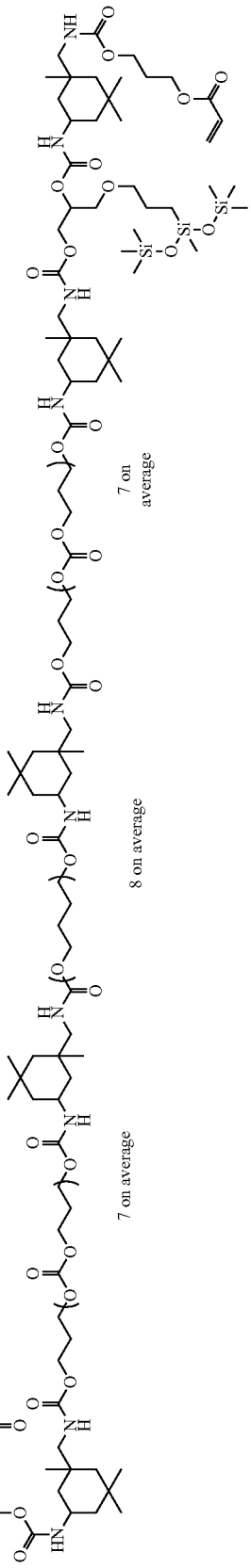
Silicone pendant urethane (meth) acrylate 13

Photo radical generator-1 blended as an additive to Stretchable film materials 1 to 18 is shown below. Photo radical generator-1: diphenyl(2,4,6-trimethylbenzoyl)phosphine oxide A monomer having an alkyl group or an aryl group blended to Stretchable film materials 1 to 18 is shown below. Monomer having an alkyl group or an aryl group: isobornyl acrylate or trimethylolpropane triacrylate Examples, Comparative Examples According to compositions shown in Table 1, Stretchable film materials 1 to 18 (compositions for forming a stretchable film) were prepared by mixing the silicone urethane compounds having a (meth)acrylate group at a terminal, and so forth, with the photo radical generator.

TABLE 1

| Stretchable film material | Urethane acrylate (parts by mass) | Additive (parts by mass) |
| --- | --- | --- |
| Stretchable film material 1 | Silicone pendant urethane (meth)acrylate 1 (70) Isobornyl acrylate (30) | Photo radical generator-1 (1) |
| Stretchable film material 2 | Silicone pendant urethane (meth)acrylate 2 (70) Isobornyl acrylate (30) | Photo radical generator-1 (1) |
| Stretchable film material 3 | Silicone pendant urethane (meth)acrylate 3 (75) Isobornyl acrylate (25) | Photo radical generator-1 (1) |
| Stretchable film material 4 | Silicone pendant urethane (meth)acrylate 4 (70) Isobornyl acrylate (30) | Photo radical generator-1 (1) |
| Stretchable film material 5 | Silicone pendanturethane (meth)acrylate 5 (80) Isobornyl acrylate (20) | Photo radical generator-1 (1) |
| Stretchable film material 6 | Silicone pendant urethane (meth)acrylate 6 (80) Isobornyl acrylate (20) | Photo radical generator-1 (1) |
| Stretchable film material 7 | Silicone pendant urethane (meth)acrylate1 (70) Isobornyl acrylate (27) Trimethylolpropane triacrylate (3) | Photo radical generator-1 (1) |
| Stretchable film material 8 | Silicone pendant urethane (meth)acrylate 7 (70) Isobornyl acrylate (30) | Photo radical generator-1 (1) |
| Stretchable film material 9 | Silicone pendant urethane (meth)acrylate 8 (70) Isobornyl acrylate (30) | Photo radical generator-1 (1) |
| Stretchable film material 10 | Urethane (meth)acrylate 1 (70) Isobornyl acrylate (30) | Photo radical generator-1 (1) |
| Stretchable film material 11 | Urethane (meth)acrylate 2 (100) Isobornyl acrylate (30) | Photo radical generator-1 (1) |
| Stretchable film material 12 | Urethane (meth)acrylate 3 (70) Isobornyl acrylate (30) | Photo radical generator-1 (1) |
| Stretchable film material 13 | Silicone pendant urethane (meth)acrylate 1 (40) Silicone pendant urethane (meth)acrylate 7 (30) Isobornyl acrylate (30) | Photo radical generator-1 (1) |
| Stretchable film material 14 | Silicone pendant urethane (meth)acrylate 9 (75) Isobornyl acrylate (25) | Photo radical generator-1 (1) |
| Stretchable film material 15 | Silicone pendant urethane (meth)acrylate 10 (75) Isobornyl acrylate (25) | Photo radical generator-1 (1) |
| Stretchable film material 16 | Silicone pendant urethane (meth)acrylate 11 (70) Isobornyl acrylate (30) | Photo radical generator-1 (1) |
| Stretchable film material 17 | Silicone pendant urethane (meth)acrylate 12 (75) Isobornyl acrylate (25) | Photo radical generator-1 (1) |
| Stretchable film material 18 | Silicone pendant urethane (meth)acrylate 13 (70) Isobornyl acrylate (30) | Photo radical generator-1 (1) |

(Preparation of Stretchable Films)

A 6-inch synthetic quartz substrate was prepared whose surface had holes arranged in a lattice form, each hole being formed at an angle of 70° with a depth of 5 micron, one side of 10 micron, and a pitch of 20 micron. The pattern of this synthetic quartz was formed by photolithography and dry etching. The substrate was baked on a hot plate at 150° C. for 60 seconds, then spin-coated with a 1% toluene solution of triethoxy(1H,1H,2H,2H-heptadecafluorodecyl)silane, and baked on a hot plate at 100° C. for 60 seconds to evaporate the solvent. Consequently, the quartz substrate was fluoroalkylated.

In Example 1 and Comparative Example 3, the stretchable film materials shown in Table 2 as the uneven pattern film material were applied using a slit coater, and cured by irradiation with light of 500 mJ/cm$^2$ from a 1,000 W xenon lamp in a nitrogen atmosphere. The resultant was peeled from the synthetic quartz substrate. Thus, stretchable films each having the uneven pattern on the top surface were prepared.

In Examples 2 to 8 and 10 to 15, the stretchable film materials shown in Table 2 as the flat-film material were each applied using a slit coater onto a Teflon (registered trademark) film, and cured by irradiation with light of 500 mJ/cm$^2$ from a 1,000 W xenon lamp in a nitrogen atmosphere to form a flat stretchable film. The stretchable film materials shown in Table 2 as the uneven pattern film material were each applied by the bar coating method onto the fluoroalkylated quartz substrate. Then, the flat stretchable film prepared above was firmly attached to the resulting surface. The uneven portion at the top surface of the stretchable film was cured by irradiation with light of 500 mJ/cm$^2$ from a 1,000 W xenon lamp in a nitrogen atmosphere, and peeled from the synthetic quartz substrate. Thus, stretchable films each having the uneven pattern on the top surface were formed.

In Example 9, the stretchable film material in Table 2 as the uneven pattern film material was applied by the bar coating method onto the fluoroalkylated quartz substrate. The uneven portion at the top surface of the stretchable film was cured by irradiation with light of 500 mJ/cm$^2$ from a 1,000 W xenon lamp in a nitrogen atmosphere. Then, the stretchable film material shown in Table 2 as the flat-film material was applied using a slit coater onto the resulting surface, irradiated with light of 500 mJ/cm$^2$ from a 1,000 W xenon lamp in a nitrogen atmosphere, and peeled from the uneven quartz substrate. Thus, a stretchable film having the uneven pattern on the top surface was prepared.

In Comparative Examples 1, 2, the stretchable film materials shown in Table 2 as the flat-film material were each applied using a slit coater onto a Teflon (registered trademark) film. The stretchable film was cured by irradiation with light of 500 mJ/cm² from a 1,000 W xenon lamp in a nitrogen atmosphere.

(Measurement of Film Thickness, Contact Angle, Stretching Property, Strength, and Surface Tackiness)

After the curing, the stretchable films having a repeated uneven pattern on the top surface (Examples 1 to 15) and the stretchable films of Comparative Examples (Comparative Examples 1 to 3) were measured for film thickness, contact angle with water on the top surface, and tackiness by touching each film with finger. Moreover, after each stretchable film was measured for the contact angle with water on the top surface, the stretchable film was peeled from the substrate to measure the stretching property and strength by a method in conformity to JIS K 6251. Table 2 shows the results.

TABLE 2

| | Uneven pattern film material | Flat-film material | Stretchable film thickness (μm) | Contact angle (°) | Elongation (%) | Strength (MPa) | Surface tackiness |
|---|---|---|---|---|---|---|---|
| Example 1 | Stretchable film material 1 | — | 180 | 120 | 290 | 16.1 | none |
| Example 2 | Stretchable film material 2 | Stretchable film material 7 | 190 | 122 | 280 | 15.1 | none |
| Example 3 | Stretchable film material 3 | Stretchable film material 8 | 210 | 120 | 290 | 16.3 | none |
| Example 4 | Stretchable film material 4 | Stretchable film material 9 | 226 | 128 | 280 | 14.3 | none |
| Example 5 | Stretchable film material 5 | Stretchable film material 10 | 160 | 118 | 290 | 16.0 | none |
| Example 6 | Stretchable film material 6 | Stretchable film material 10 | 230 | 128 | 290 | 14.5 | none |
| Example 7 | Stretchable film material 6 | Stretchable film material 11 | 250 | 128 | 310 | 15.3 | none |
| Example 8 | Stretchable film material 6 | Stretchable film material 12 | 210 | 129 | 320 | 15.8 | none |
| Example 9 | Stretchable film material 6 | Stretchable film material 12 | 260 | 130 | 290 | 15.0 | none |
| Example 10 | Stretchable film material 13 | — | 210 | 117 | 290 | 22.1 | none |
| Example 11 | Stretchable film material 14 | Stretchable film material 7 | 210 | 116 | 280 | 26.1 | none |
| Example 12 | Stretchable film material 15 | Stretchable film material 7 | 220 | 115 | 280 | 23.8 | none |
| Example 13 | Stretchable film material 16 | Stretchable film material 7 | 225 | 120 | 280 | 22.5 | none |
| Example 14 | Stretchable film material 17 | Stretchable film material 7 | 230 | 115 | 260 | 24.8 | none |
| Example 15 | Stretchable film material 18 | Stretchable film material 7 | 235 | 116 | 270 | 23.3 | none |
| Comparative Example 1 | — | Stretchable film material 1 | 180 | 96 | 340 | 13.2 | a little |

TABLE 2-continued

| | Uneven pattern film material | Flat-film material | Stretchable film thickness (μm) | Contact angle (°) | Elongation (%) | Strength (MPa) | Surface tackiness |
|---|---|---|---|---|---|---|---|
| Comparative Example 2 | | Stretchable film material 10 | 220 | 72 | 430 | 16.1 | exist |
| Comparative Example 3 | Stretchable film material 10 | — | 220 | 58 | 410 | 15.6 | a little |

As shown in Table 2, the inventive stretchable films showed higher water repellency, strength, and stretchability, with the top surfaces having low tackiness.

On the other hand, the film with no uneven pattern on the top surface as those in Comparative Examples 1, 2 lacked water repellency, and had such a property that the films of the same kind are stuck with each other due to the surface tackiness. In Comparative Example 3, the film had a repeated uneven pattern on the top surface but was made of polyurethane containing no silicone, so that the water repellency was low and the film had surface tackiness.

The above results revealed that the inventive stretchable film has excellent stretchability and strength, together with excellent water repellency and low tackiness on the film top surface, and the hysteresis with respect to repeated stretching is also favorable. Thus, the inventive stretchable film has excellent properties as a film that is capable of printing stretchable wirings used for wearable devices and so on.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A stretchable film comprising, at least as a top surface of the stretchable film, a cured product of a stretchable film material comprising a silicone polyurethane resin, wherein the top surface of the stretchable film has a repeated uneven pattern formed with depths of 0.1 μm to 2 mm and pitches of 0.1 μm to 5 mm, and wherein the silicone polyurethane resin is a silicone-pendant polyurethane resin having a structure shown by the following general formula (1):

(1)

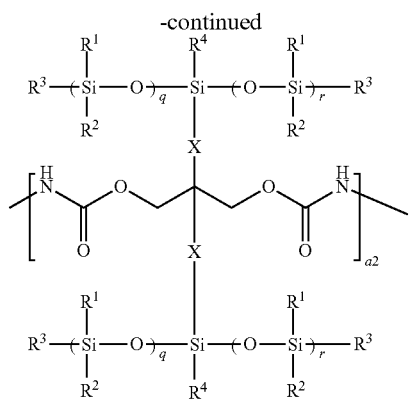

wherein $R^1$, $R^2$, and $R^3$ may be identical to or different from each other and each represent a linear, branched, or cyclic alkyl group having 1 to 6 carbon atoms, a phenyl group, or a 3,3,3-trifluoropropyl group; $R^4$'s may be identical to or different from each other and each represent a linear, branched, or cyclic alkyl group having 1 to 6 carbon atoms, a phenyl group, a 3,3,3-trifluoropropyl group, or a —$(OSiR^1R^2)_s$—$OSiR^1R^2R^3$ group; $R^5$ represents a hydrogen atom or a linear or branched alkyl group having 1 to 4 carbon atoms; $R^6$ represents a single bond, a methylene group, or an ethylene group; $R^7$ represents a hydrogen atom or a methyl group; X represents a linear or branched alkylene group having 3 to 7 carbon atoms and optionally containing an ether group; "q", "r", and "s" each represent an integer in a range of 0 to 20; and a1 and a2 represent proportions of repeating units and satisfy ranges of 0≤a1<1.0, 0≤a2<1.0, and 0<a1+a2≤1.0.

2. The stretchable film according to claim 1, wherein the silicone polyurethane resin has a polycarbonate structure and/or a polyester structure.

3. The stretchable film according to claim 2, wherein the silicone-pendant polyurethane resin has a structure shown by the following general formula (2):

(2)

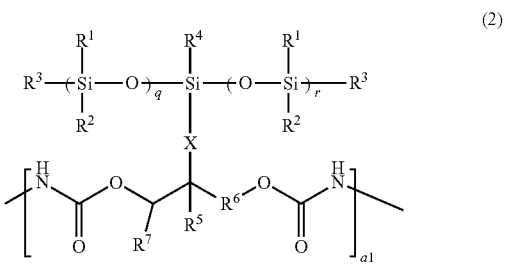

-continued

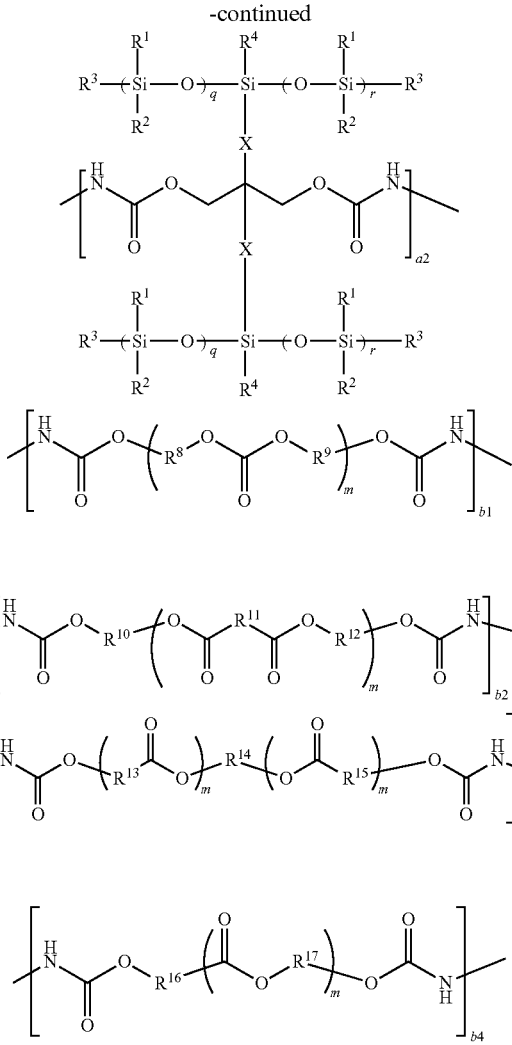

wherein $R^1$ to $R^7$, X, "q", "r", a1, and a2 are as defined above; $R^8$ to $R^{17}$ may be identical to or different from each other and each represent a linear, branched, or cyclic alkylene group having 2 to 12 carbon atoms, or an arylene group having 6 to 12 carbon atoms; "m"s may be identical to or different from each other and each represent 1 to 200; and b1, b2, b3, and b4 represent proportions of repeating units and satisfy ranges of $0 \leq b1 < 1.0$, $0 \leq b2 < 1.0$, $0 \leq b3 < 1.0$, $0 \leq b4 < 1.0$, and $0 < b1+b2+b3+b4 < 1.0$.

4. The stretchable film according to claim 3, wherein the silicone-pendant polyurethane resin has a structure shown by the following general formula (3):

(3)

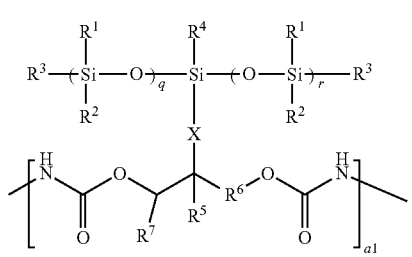

-continued

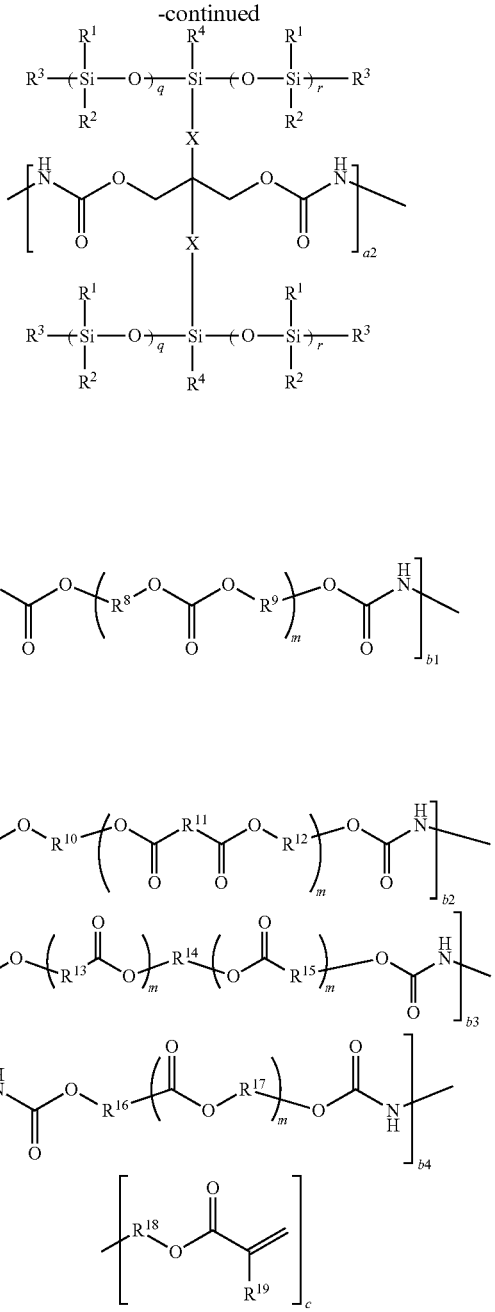

wherein $R^1$ to $R^{17}$, X, "m", "q", "r", a1, a2, b1, b2, b3, and b4 are as defined above; $R^{18}$ represents a linear, branched, or cyclic alkylene group having 1 to 20 carbon atoms and optionally having an ether group or an ester group; $R^{19}$ represents a hydrogen atom or a methyl group; and "c" represents the number of unit in one molecule and satisfies a range of $1 \leq c \leq 4$.

5. The stretchable film according to claim 2, wherein the stretchable film has a stretching property in a range of 20 to 1000% in a tensile test stipulated according to JIS K 6251.

6. The stretchable film according to claim 2, wherein the stretchable film is used as a film in contact with a stretchable conductive wiring.

7. The stretchable film according to claim 1, wherein the silicone-pendant polyurethane resin has a structure shown by the following general formula (2):

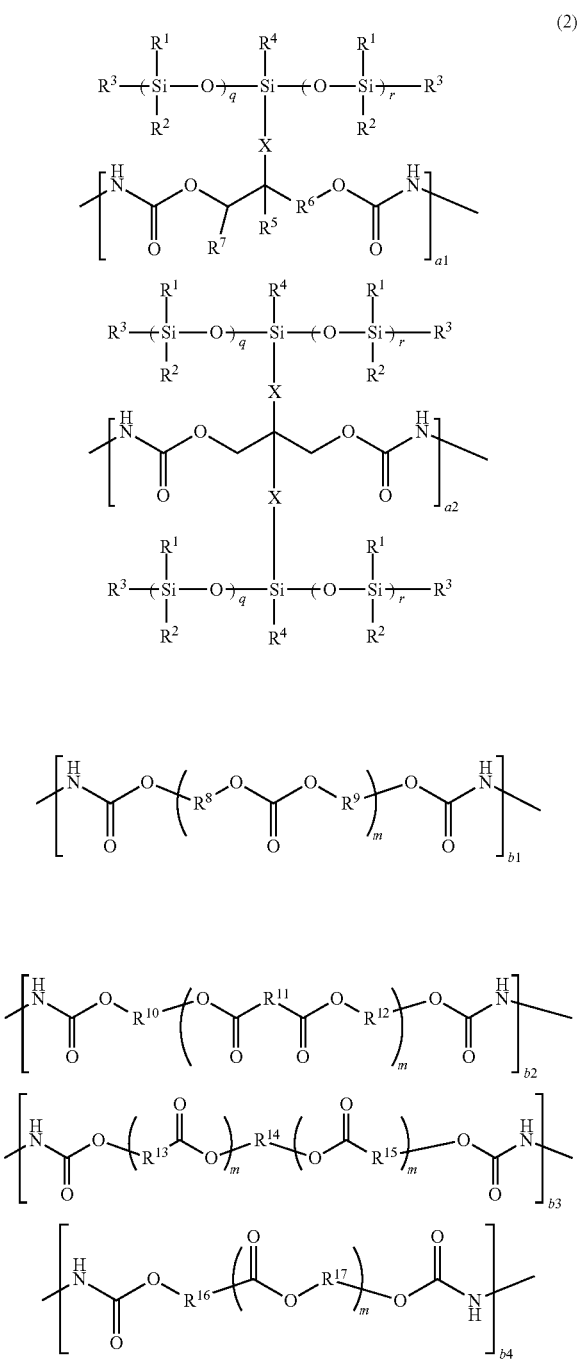

(2)

wherein $R^1$ to $R^7$, X, "q", "r", a1, and a2 are as defined above; $R^8$ to $R^{17}$ may be identical to or different from each other and each represent a linear, branched, or cyclic alkylene group having 2 to 12 carbon atoms, or an arylene group having 6 to 12 carbon atoms; "m"s may be identical to or different from each other and each represent 1 to 200; and b1, b2, b3, and b4 represent proportions of repeating units and satisfy ranges of $0 \leq b1 < 1.0$, $0 \leq b2 < 1.0$, $0 \leq b3 < 1.0$, $0 \leq b4 < 1.0$, and $0 < b1+b2+b3+b4 < 1.0$.

8. The stretchable film according to claim 7, wherein the silicone-pendant polyurethane resin has a structure shown by the following general formula (3):

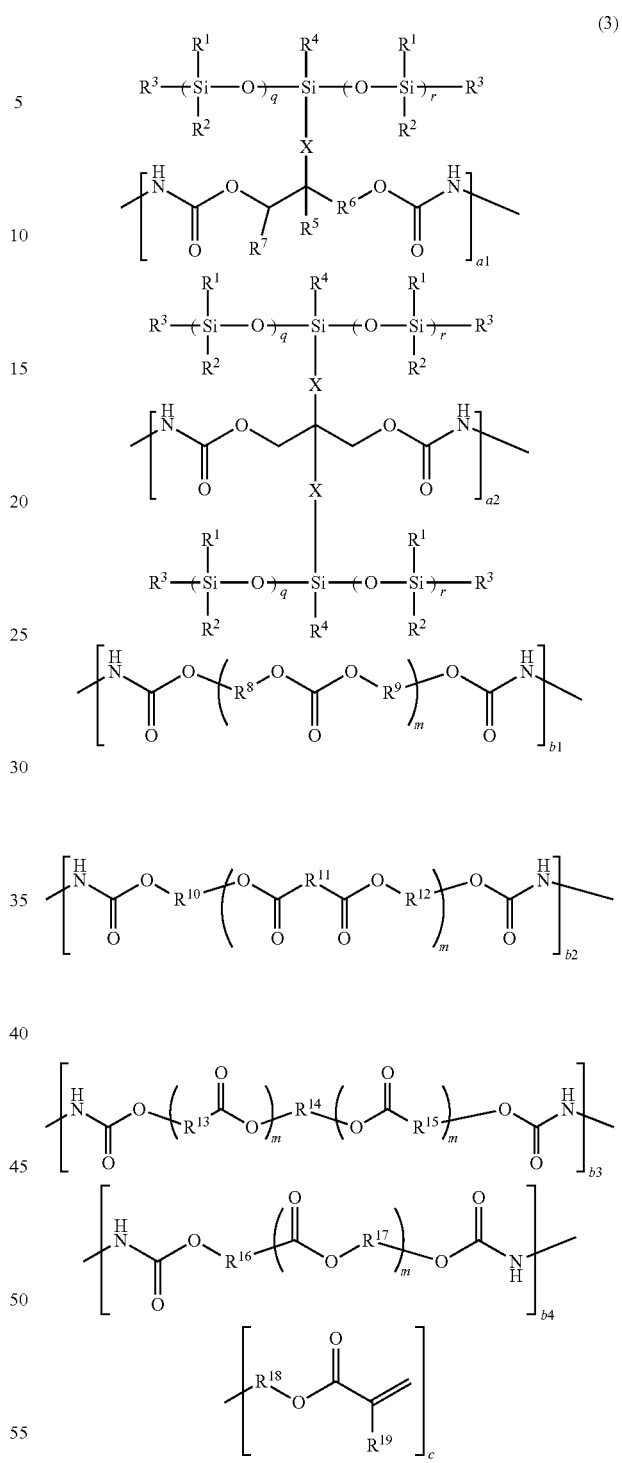

(3)

wherein $R^1$ to $R^{17}$, X, "m", "q", "r", a1, a2, b1, b2, b3, and b4 are as defined above; $R^{18}$ represents a linear, branched, or cyclic alkylene group having 1 to 20 carbon atoms and optionally having an ether group or an ester group; $R^{19}$ represents a hydrogen atom or a methyl group; and "c" represents the number of unit in one molecule and satisfies a range of $1 \leq c \leq 4$.

9. The stretchable film according to claim 2, wherein the silicone-pendant polyurethane resin has a structure shown by the following general formula (3):

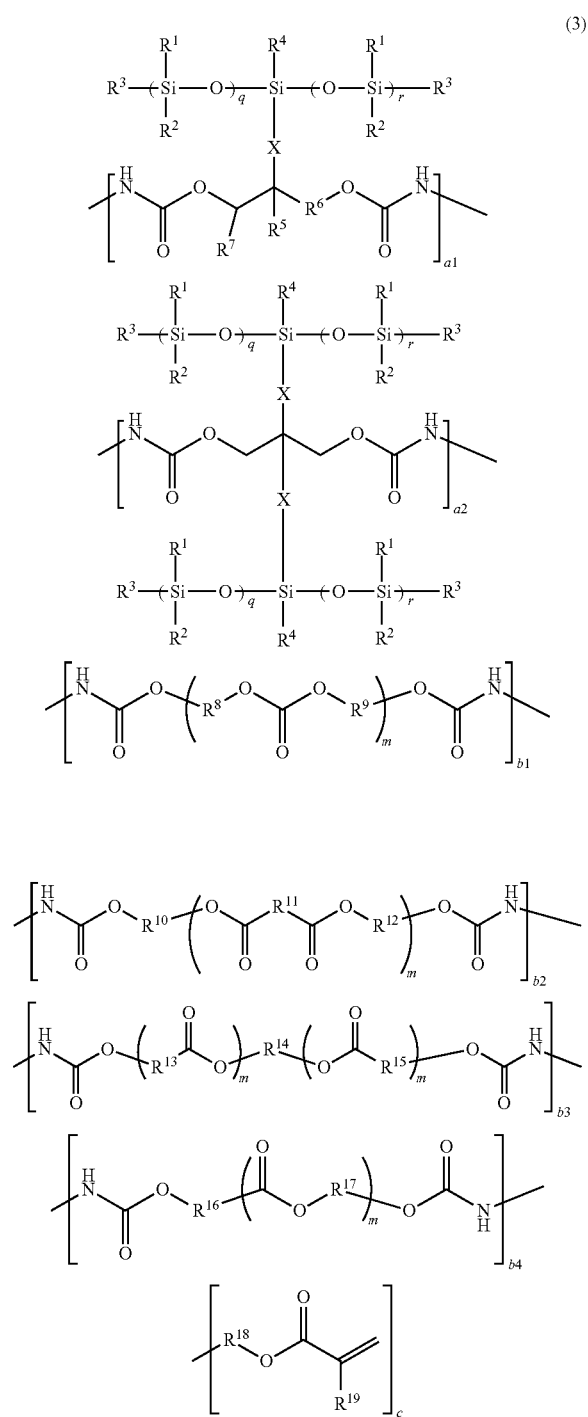

wherein $R^1$ to $R^{17}$, X, "m", "q", "r", a1, a2, b1, b2, b3, and b4 are as defined above; $R^{18}$ represents a linear, branched, or cyclic alkylene group having 1 to 20 carbon atoms and optionally having an ether group or an ester group; $R^{19}$ represents a hydrogen atom or a methyl group; and "c" represents the number of unit in one molecule and satisfies a range of $1 \leq c \leq 4$.

10. The stretchable film according to claim 1, wherein the silicone-pendant polyurethane resin has a structure shown by the following general formula (3):

(3)

wherein $R^1$ to $R^{17}$, X, "m", "q", "r", a1, a2, b1, b2, b3, and b4 are as defined above; $R^{18}$ represents a linear, branched, or cyclic alkylene group having 1 to 20 carbon atoms and optionally having an ether group or an ester group; $R^{19}$ represents a hydrogen atom or a methyl group; and "c" represents the number of unit in one molecule and satisfies a range of $1 \leq c \leq 4$.

11. The stretchable film according to claim 1, wherein the stretchable film has a stretching property in a range of 20 to 1000% in a tensile test stipulated according to JIS K 6251.

12. The stretchable film according to claim 1, wherein the stretchable film is used as a film in contact with a stretchable conductive wiring.

13. A method for forming a stretchable film, comprising the steps of:

(1) applying a stretchable film material comprising a silicone-pendant polyurethane resin having a structure shown by the following general formula (1) onto a substrate having a repeated uneven pattern formed with depths of 0.1 µm to 2 mm and pitches of 0.1 µm to 5 mm;
(2) curing the stretchable film material by heating and/or light irradiation; and
(3) peeling a cured product of the stretchable film material from the substrate,

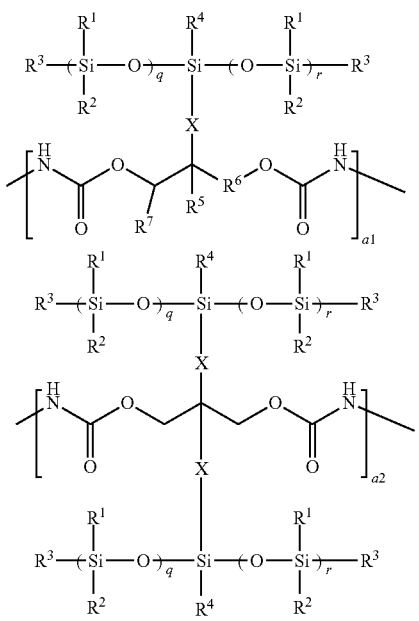

wherein $R^1$, $R^2$, and $R^3$ may be identical to or different from each other and each represent a linear, branched, or cyclic alkyl group having 1 to 6 carbon atoms, a phenyl group, or a 3,3,3-trifluoropropyl group; $R^4$'s may be identical to or different from each other and each represent a linear, branched, or cyclic alkyl group having 1 to 6 carbon atoms, a phenyl group, a 3,3,3-trifluoropropyl group, or a —(OSiR$^1$R$^2$)$_s$—OSiR$^1$R$^2$R$^3$ group; $R^5$ represents a hydrogen atom or a linear or branched alkyl group having 1 to 4 carbon atoms; $R^6$ represents a single bond, a methylene group, or an ethylene group; $R^7$ represents a hydrogen atom or a methyl group; X represents a linear or branched alkylene group having 3 to 7 carbon atoms and optionally containing an ether group; "q", "r", and "s" each represent an integer in a range of 0 to 20; and a1 and a2 represent proportions of repeating units and satisfy ranges of 0≤a1<1.0, 0≤a2<1.0, and 0<a1+a2≤1.0.

14. The method for forming a stretchable film according to claim 13, comprising, between the step (1) and the step (2), (1') a step of pressure-bonding a polyurethane film onto the stretchable film material.

15. The method for forming a stretchable film according to claim 13, comprising, between the step (2) and the step (3),
(2'-1) a step of coating the cured product of the stretchable film material with a stretchable film material containing a polyurethane resin, and
(2'-2) a step of curing the stretchable film material containing the polyurethane resin by heating and/or light irradiation to form a polyurethane film.

* * * * *